United States Patent [19]
Wunderlich et al.

[11] Patent Number: 5,751,998
[45] Date of Patent: May 12, 1998

[54] MEMORY ACCESSING SYSTEM WITH PORTIONS OF MEMORY BEING SELECTIVELY WRITE PROTECTABLE AND RELOCATABLE BASED ON PREDEFINED REGISTER BITS AND MEMORY SELECTION RAM OUTPUTS

[75] Inventors: Russell J. Wunderlich; Mark Taylor, both of Houston; Charles J. Stancil, Tomball; Mikal C. Hunsaker; Brian V. Belmont, both of Houston, all of Tex.

[73] Assignee: Compaq Computer Corporation, Houston, Tex.

[21] Appl. No.: 450,548

[22] Filed: May 25, 1995

Related U.S. Application Data

[63] Continuation of Ser. No. 878,437, May 4, 1992, abandoned.

[51] Int. Cl.⁶ ................................................. G06F 12/14
[52] U.S. Cl. ............................................................. 395/490
[58] Field of Search ................................... 395/490, 479

[56] References Cited

U.S. PATENT DOCUMENTS

| | | | |
|---|---|---|---|
| 4,665,506 | 5/1987 | Cline et al. | 365/189.01 |
| 4,695,948 | 9/1987 | Blevins et al. | 395/306 |
| 4,698,750 | 10/1987 | Wilkie et al. | 365/185.04 |
| 4,849,875 | 7/1989 | Fairman et al. | 395/846 |
| 5,325,499 | 6/1994 | Kummer et al. | 395/470 |
| 5,341,494 | 8/1994 | Thayer et al. | 395/442 |

FOREIGN PATENT DOCUMENTS

| | | |
|---|---|---|
| 0 200 440 A3 | 5/1986 | European Pat. Off. . |
| 0 338 089 A1 | 10/1989 | European Pat. Off. . |
| 0 359 235 A2 | 3/1990 | European Pat. Off. . |
| 0 426 386 A2 | 4/1991 | European Pat. Off. . |
| 29 49 768 A1 | 6/1980 | Germany . |
| WO-4-8 809 012 | 11/1988 | WIPO . |

OTHER PUBLICATIONS

A. Larsen, Unique Memory Mapper Mproves Performance of PC Architectures, Computer Technology Review IX, Spring 1989, pp. 63, 64, 66.

Protection Mechanism for Dynamic Bankswitched Memory In a System Without a Protect Mode Microprocessor, vol. 33, No. 3A, IBM Technical Disclosure Bulletins, 1990, pp. 262–263.

*Primary Examiner*—Eddie P. Chan
*Assistant Examiner*—Reginald G. Bragdon
*Attorney, Agent, or Firm*—Pravel, Hewitt, Kimball & Krieger

[57] ABSTRACT

A memory mapping and module enabling circuit for allowing logical 128 kbyte memory blocks to be defined for any location in any module connected to a memory system. A RAM is addressed by the system address lines defining 128 kbyte blocks, with the output data providing the row address strobe enable signals for a particular memory module and the address values necessary to place the 128 kbyte block within the module. Various other parameters such as write protect status and memory location are also provided by the RAM. Circuits and techniques for programming and reading the RAM are provided. The RAM is only programmed once, with modifications to the RAM-provided write protect status and memory location values being made based on write protect and relocation status information contained in a separate register.

24 Claims, 12 Drawing Sheets

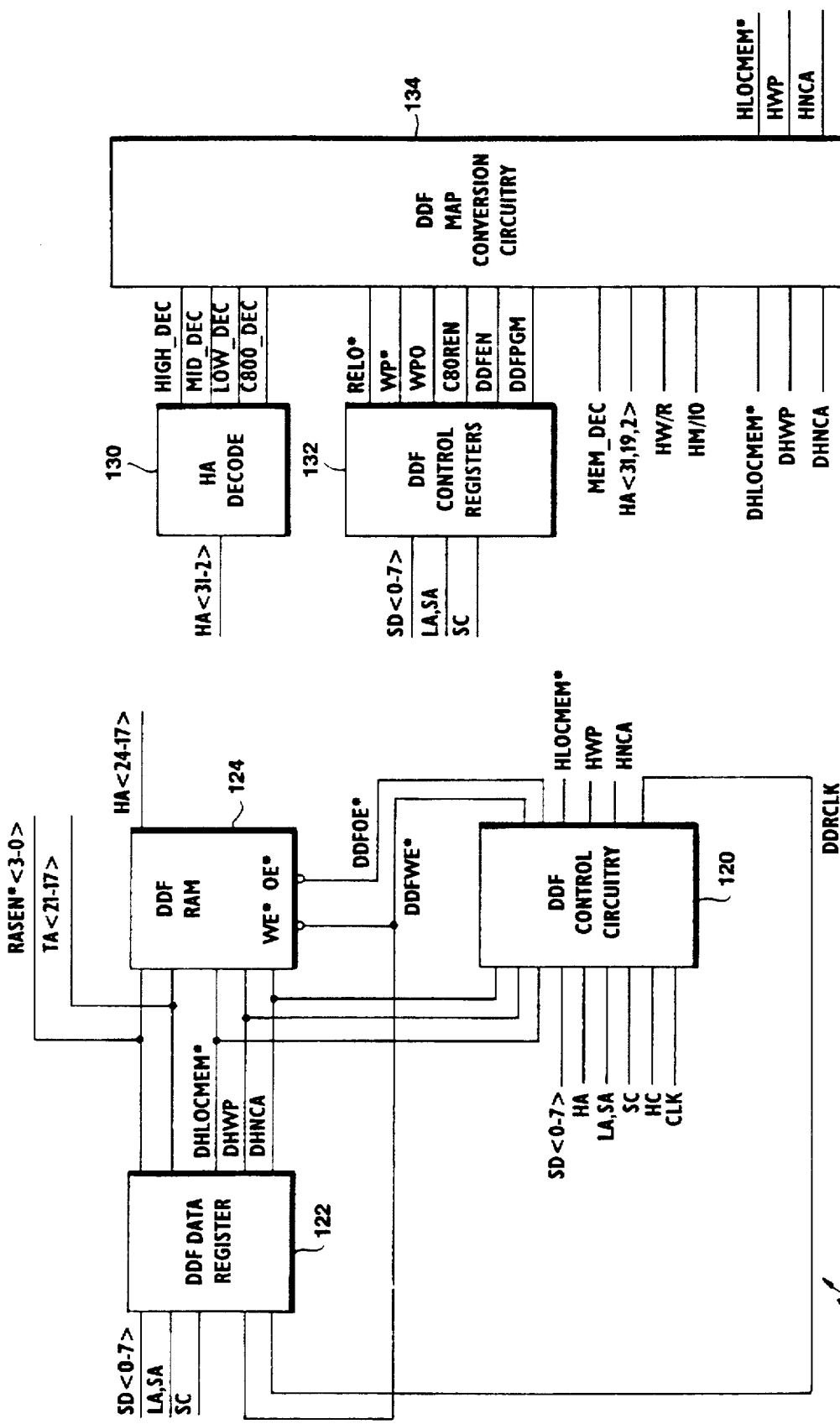

5,751,998

MEMORY ACCESSING SYSTEM WITH PORTIONS OF MEMORY BEING SELECTIVELY WRITE PROTECTABLE AND RELOCATABLE BASED ON PREDEFINED REGISTER BITS AND MEMORY SELECTION RAM OUTPUTS

This is a continuation of application Ser. No. 07/878,437 filed on May 4, 1992 now abandoned.

BACKGROUND OF THE INVENTION

1. Field of the Invention

The invention relates to memory mapping and enabling systems used in computers.

2. Description of Prior Art

Personal computer systems are becoming more complex and powerful at a rapid rate. With the introductions by Intel Corporation (Intel) of the 80286 and 80386 microprocessors, large amounts of memory could be readily utilized. Therefore, it was desirable that the computer system be capable of containing large amounts of memory, particularly memory that was the same width as the microprocessor in the computer system. The situation was complicated because memory was relatively expensive, so the memory was only added in certain modular sizes, often through the use of piggy-backed modules or single in-line memory modules which contained dynamic random access memory (DRAM) devices. The modules varied in cost and memory size based on the number and size of the memory devices utilized. The system board or base memory board contained numerous locations for the insertion of the modules. Conventionally the modules had very little circuitry beyond the memory devices, so the various strobe signals needed by DRAM's had to be developed by the memory system. This required developing the proper row and column address strobe signals for the appropriate module. Problems arose because of the different size modules and because the modules could physically be installed in one of several locations. Because of limitations of the strobe developing circuitry, the modules were required to be installed in certain orders, depending on module size and the number of modules. Thus, system installers and users were limited in their flexibility of installing memory modules.

Additionally, provisions had to be made for portions of the memory failing. The cost of memory modules was such that it was not reasonable to require replacement of an entire module if only a portion of the module failed. Various remapping schemes were developed to perform this function automatically, but the techniques exacerbated the strobe development problems. Therefore the remapping capabilities were relatively limited. Thus the user had limitations on where memory modules could be located in the system and how many errors could develop before requiring replacement of the module.

Further complicating the situation was the need, especially in the 80386-based computer systems, to transfer the basic input/output system (BIOS) code from slow read only memory (ROM) to faster random access memory (RAM) to improve system performance. Also, certain areas of memory had to be write protected for various reasons. Add these situations to the other factors and the final result had been computer systems with complex memory system designs which were still relatively inflexible as to the location and arrangement of memory modules and remapping capabilities.

One system to address the problems is described in European Patent Application No. 90 311 749.7, entitled "Data Destination Facility" and published on May 8, 1991 and the counterpart U.S. Pat. No. 5,341,494, entitled MEMORY ACCESSING SYSTEM WITH AN INTERFACE AND MEMORY SELECTION UNIT UTILIZING WRITE PROTECT AND STROBE SIGNALS, issued Aug. 23, 1994, which are hereby incorporated by reference. In that system, a data destination facility (DDF) RAM was used for holding address translation, memory module and bank selection, write protect, cacheable status and local memory information. The system upper memory address lines defining 128 kbyte blocks were provided to the DDF RAM as some of the address inputs, with the data being the above information. As noted, the system memory address lines only provided a portion of the addressing of the DDF RAM. The upper two bits were provided by two bits previously used to control write protection and remapping and relocation of the BIOS from ROM to RAM. These two bits had previously been located in a specific memory-mapped register. To maintain compatability with previous software as indicated in the applications, it was thus necessary to set all four possibilities of these two bits and program the DDF RAM for each case. This was a time consuming and complex task, so while the system provided many advantages over its prior art, several areas for improvement remained.

SUMMARY OF THE PRESENT INVENTION

The computer system incorporating the present invention improves upon the system described in the European patent application by allowing the programming of the DDF RAM in a single pass. Remapping hardware is provided to utilize the data provided from the DDF RAM in conjunction with the write protect and relocation bits from the conventional register (or an equivalent register) in producing final write protect and relocation information which is provided to the memory controller and the bus controller.

The conversion hardware utilizes the states of the relocation and write protect bits to convert the local memory, write protect and noncacheable outputs of the DDF according to the appropriate condition. However, in some cases it may be desirable to override certain portions of the write protection. For example, if a full linear memory address space is desired above the one Megabyte boundary for example, write protection would be undesirable for the ROM copies accessible through the upper addresses. In that case, the system according to the present invention utilizes a write protect override bit so that even if the write protect bit is set, then the relocated copies of the ROM information which are contained in higher memory locations are not write protected.

In addition, the system according to the present invention remaps the region designed for the video ROM from E0000h-E7FFFh to C0000h-C7FFFh. One problem occurs however, in that this is the option ROM area of an IBM PC compatible computer and therefore there may be numerous add-in and option boards present in this C0000h space. Because the granularity of the DDF RAM is 128 kbytes, setting the block for the desired characteristics of the relocated video ROM would hinder operation of the option boards. To allow this condition to be resolved, a bit is also provided to force addresses from C80000h to EFFFFh to be considered as non-local, non-write protected and non-cacheable to conform to conventional option ROM space use, allowing the processor to then access the option boards normally. In this manner, remapping, write protection and caching of the video ROM can be done without also sacrificing all of the option ROM space when using the DDF RAM.

Programming of the DDF RAM is performed in a manner similar to that in the system disclosed in the referenced applications, except that the system according to the present invention allows a greatly simplified programming and reduced time of programming as only one pass need be made through the DDF RAM.

BRIEF DESCRIPTION OF THE DRAWINGS

A better understanding of the present invention can be obtained when the following detailed description of the preferred embodiment is considered in conjunction with the following drawings, in which:

FIG. 3 is a more detailed schematic block diagram of the DDF logic 104 of FIG. 2;

FIG. 4 is a yet more detailed block diagram of portions of the DDF control circuitry 120 of FIG. 3;

DETAILED DESCRIPTION OF THE PREFERRED EMBODIMENT

Figure 1:
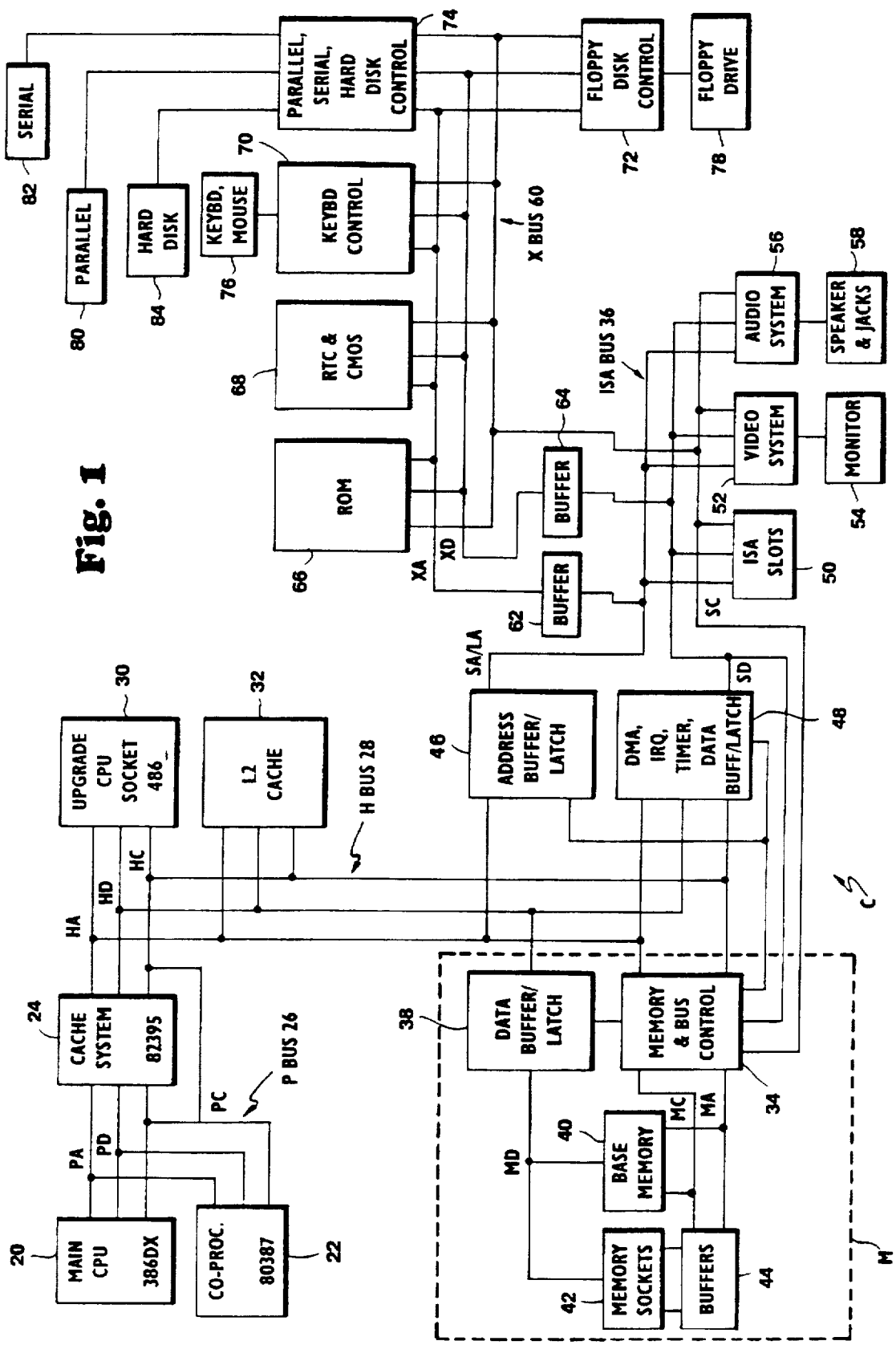
FIG. 1 is a schematic block diagram of a computer system incorporating the present invention.

Referring now to FIG. 1, the letter C designates generally a computer system incorporating the present invention. System C is comprised of a number of block elements interconnected via four buses. Throughout this specification, signal mnemonics with an asterisk following the signal mnemonic indicates that the signal is may be active at a logic low level and always is the inverse of a signal mnemonic without the asterisk. Signal mnemonics having numbers or ranges between angle brackets refer to those particular bits or positions in a bus.

A main CPU 20 is connected to a numeric coprocessor 22 and to a cache system 24. A bus, generally referred to as the P or processor bus 26 is used to connect the main CPU 20, the numeric coprocessor 22 and the cache system 24. The P bus 26 has several portions, such as the address portion PA, the data portion PD and the control portion PC. Preferably the main CPU 20 is an Intel Corporation 80386DX-25 microprocessor, while the numeric coprocessor is an 80387 and the cache system 24 is an 82395 cache controller.

A second bus referred to as the H or host bus 28 is used to connect the cache system 24 to various other elements in the computer system C. The host bus 28 also has address HA, data HD, and control HC portions. An upgrade CPU socket 30 is connected to the host bus 28 and receives various processors of the 486 family developed by Intel. In addition, a level 2 or secondary cache 32 is connected to the host bus 28 for operation.

In the preferred embodiment a combined memory and bus controller 34 is connected to the host bus 28 to provide control of the memory utilized in the computer system C and to develop control signal SC for a third bus, the Industry Standard Architecture (ISA) bus 36. Describing now the memory portion M of the computer system C, the memory and bus controller 34 provides control signals to a data buffer/latch unit 38 which is connected to the HD bus. A memory data or MD bus is provided from the data buffer/latch 38 to base memory 40 and to memory sockets 42. Preferably the base memory 40 is developed by using a plurality of dynamic random access memories (DRAMs) which are soldered to the main circuit board of the computer system C. The memory sockets 42 are preferably designed to receive single in-line memory modules (SIMMs). The memory and bus controller 34 provides the memory control MC and memory address MA signals to the base memory 40 and to buffers 44, which are in turn connected to the memory sockets 42. More detail on the memory and bus controller 34 and the various other components of the memory system M will be provided below.

As noted above, the memory and bus controller 34 helps develop control signals for SC portion of the ISA bus 36. In addition, the memory and bus controller 34 is connected to an address buffer/latch 46 which is connected between the HA bus and develops the SA/LA address bus portion as utilized in the ISA bus 36. The memory and bus controller 34 is also connected to a combined unit system peripheral 48 which includes a DMA controller, an interrupt controller, timers and a data buffer/latch 48. The data buffer/latch portion of the combined unit 48 is connected to the HD bus and provides the SD or data bus portion of the ISA bus 36.

Referring now to the ISA bus 36, a plurality of ISA slots 50 are provided directly off the ISA bus 36 as conventional in personal computer systems. A video system 52 is connected to the ISA bus 36, with a monitor 54 connected to the video system 52 to provide a graphic output for the computer system C. Additionally, an audio system 56 is connected to the ISA bus 36, with an internal speaker and external jacks 58 connected to the audio system 56.

Developed from the ISA bus 36 is the fourth or remaining bus referred to as the X bus 60. A buffer 62 is provided between the SA/LA bus to develop an XA address bus portion of the X bus 60, while a buffer 64 is provided between the SD bus and an XD bus portion. The SC control lines are used directly to control the X bus 60. Various internal components in the computer system C are connected to the X bus 60. For example, the read only memory (ROM) 66 containing the BIOS of the computer system C is connected to the X bus 60, as are the real time clock (RTC) and CMOS memory 68, a keyboard controller 70, a floppy disk controller 72 and a multiple peripheral controller 74. The keyboard controller 70 is connected to a keyboard and a mouse system 76 to provide user input, while the floppy disk controller 72 is connected to a floppy disk drive 78. The multiple peripheral controller 74 contains a parallel port which is connected to a parallel interface 80, a serial port which is connected to a serial interface 82 and a hard disk interface which is connected to a hard disk unit 84.

The computer system C shown in FIG. 1 is exemplary of a computer system incorporating the present invention and numerous other variations could of course be readily developed by one skilled in the art. For example, the memory and bus controller 34 could be reorganized into several discrete units which perform equivalent functions. In a like manner, the DMA/interrupt/timer and data buffer combined unit 48 could also be divided up into individual components to perform equivalent functions.

Figure 2:
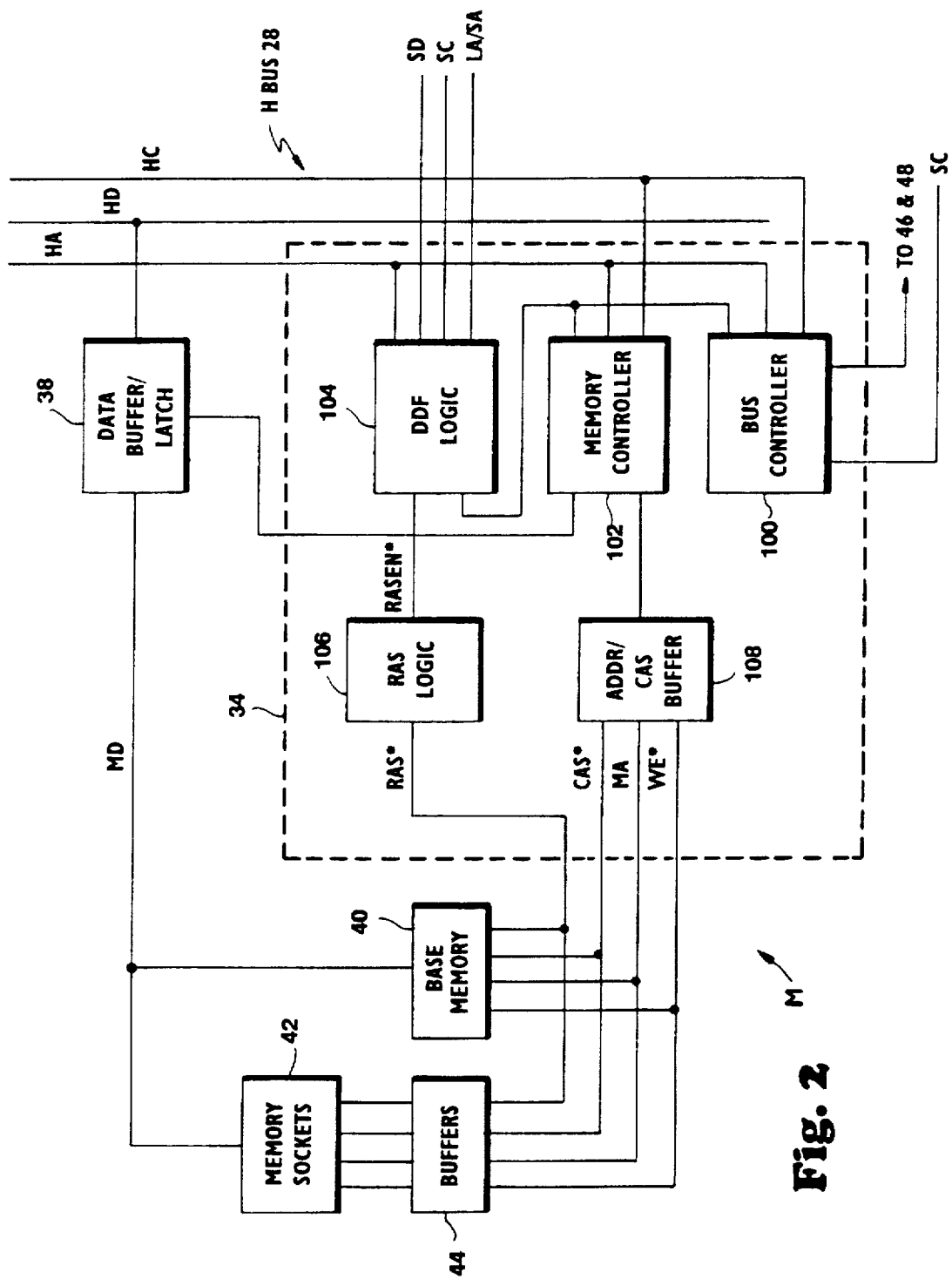
FIG. 2 is a more detailed schematic block diagram of the memory circuitry of the computer of FIG. 1.

Referring now to FIG. 2, the memory subsystem M is shown in more detail. In particular, the memory and bus controller 34 is shown with various constituents. The three main portions of the memory and bus controller 34 are a bus controller 100, a memory controller 102 and DDF logic 104. The memory controller 102 receives the HA and HC buses from the host bus 28 and various signals from the DDF logic 104. The DDF logic 104 receives the HA bus from the host bus 28 and the various buses in the ISA bus 36 and produces signals provided to the memory controller 102 and the bus controller 100 and signals referred to as the RASEN* or RAS enable signals to select a particular memory module or portion of a memory module or the base memory 40. The RASEN* signals are provided to RAS logic 106 which converts the various enable signals into individual RAS* strobes which are provided to the various memory devices. Preferably the RAS logic 106 provides nine individual RAS* signals from four RASEN* signals. Preferably RAS*<0> is used with the base memory 40, while two of the RAS*<1-8> signals are provided to each of four sockets in the memory sockets 42. The memory controller 102 provides a series of signals to an address/CAS buffer 108. The address/CAS buffer 108 then provides the CAS* signals to the memory devices, the WE* signals to the memory devices and the various memory addresses. The bus controller 100 is connected to the HA and HC bus portions of the host bus 28 and provides various control signals to the address buffer/latch 46 and the combined unit 48 and develops the SC lines for the ISA bus 36.

Proceeding now to FIG. 3, the DDF logic 104 is shown in more detail. The DDF logic 104 has three main segments: the DDF control circuitry 120, the DDF data register 122 and the DDF RAM 124. The DDF data register 122 is used to store the particular values to be written into the DDF RAM 124 and is used to latch values provided from the DDF RAM 124 when DDF read operations are occurring. The DDF RAM 124 is the memory which actually stores the particular translated addresses or TA values, the RASEN* signal values and programmable versions of the HLOCMEM* or local memory signal, the HWP or write protect signal and the HNCA or noncacheable address signal. Connected between the DDF RAM 124 and the DDF data register 122 are the DHLOCMEM*, DHWP and DHNCA signals. The RASEN*<3-0> signals are provided from the DDF RAM 124 to the RAS logic 106 and connected to the DDF data register 122, while the TA<21-17> signals are the translated addresses which are provided from the DDF logic 104 to the memory controller 102 for its providing of the proper memory addresses to the memory. The memory controller 102 utilizes the TA<21-17> signals instead of the HA<21-17> signals and the HA<16-2> signals in developing the multiplexed row and column addresses provided over the MA lines to the memory devices. The memory controller 102 does not utilize the HA<31-25> lines for local memory addressing purposes. When used in conjunction with the RASEN* signals, host bus address values in the first 32 Mbytes can be directed to any 128 kbytes memory block in the memory system M.

The DDF control circuitry 120 is used to control the operation of the DDF RAM 124, that is, when data is provided from the DDF RAM 124 or written to the DDF RAM 124, and conversion of the DHLOCMEM*, DHWP and DHNCA signals. The DDF control circuitry 120 provides a clocking signal to the DDF data register 122 so that when read operations of the DDF RAM 124 are occurring, data is properly clocked in. The DDF control circuitry also provides the final values of the HLOCMEM*, HWP and HNCA signals which are provided to the memory controller 102 and which represent, respectively, the local memory status of the particular host bus memory address value block, the write protect status of that block and the noncacheable status of that block. The DDF control circuitry 120 receives the SD<0-7> bits for data purposes, the HA, LA and SA address lines, the SC control lines, the HC control lines and a clock signal, preferably the system clock as provided to the CPU 20 operating the computer system C.

The DDF data register 122 similarly receives the SD<0-7>, LA, SA and SC lines to allow data to be written to and read from the DDF data register 122. The DDF data register 122 uses the LA and SA signals to develop an address decoded for the ports or registers, preferably two 8 bit ports, in the DDF data register 122. The SC signals are used to complete the address decode to form the final enable or latching strobe signals. The SD<0-7> signals are the data lines which provide data to or from the DDF data register 122. The DDRCLK signal is used to clock data being provided from the DDF RAM 124 so that the information can be read from the DDF data register 122. The DDFWE* signal provided to the DDF RAM 124 is used by the DDF data register 122 to enable the outputs to the DDF RAM 124. Further details of the decoding and latching are omitted for brevity, the construction well known to those skilled in the art.

The DDF RAM 124 preferably is 16 bits wide and 256 locations or greater in depth. This allows the HA<24-17> signals to be connected as the address values to result in a 128 kbyte granularity for each particular data or mapping value. Preferably the DDF RAM 124 is 20 ns static RAM to induce a minimal delay in memory operations. The WE* or write enable and OE* or output enable signals are provided by the DDF control circuitry 120 as explained below.

Referring now to FIG. 4, various blocks of the DDF control circuitry 120 are shown. A first block is the HA or host address decode block 130. This block receives the HA<31-2> signals and provides four outputs referred to as the HIGH_DEC, MID_DEC, LOW_DEC and C800_DEC or decode signals. These signals represent, respectively, the address XXFEXXXXh or XXFFXXXXh with the most significant bit one, 00FEXXXXh or 00FFXXXXh, 000FXXXXh, or 000C8000h to 000EFFFFh. These correspond to the absolute top relocation or high relocation address for the BIOS ROM, the middle relocation address for the BIOS ROM, and the low or normal address for the ROM, with the C800_DEC signal representing the option ROM space which may be returned to ISA use if desired when the video ROM is relocated from E0000h to C0000h.

A second block in the DDF control circuitry 120 is the DDF control registers 132. These are a series of registers at various addresses which are used to develop certain bits which indicate desired operating modes for the DDF logic 104 and the memory relocation, cacheability and write protect status. The DDF control register 132 receives the SD<0-7>, LA, SA and SC lines so that the various registers can be either memory and I/O port mapped. The DDF control register 132 provides the RELO* and WP* signals, which represent the relocation and write protect bits conventionally found in certain computer systems such as Compaq Computer Corporation systems at memory address 80C00000h in the diagnostic registers. The DDF control registers 132 also provide the WPO or write protect override signal, used to allow development of a linear address map above the one Mbyte boundary; the C80REN or C8000 reenable signal, used to return the C8000h to EFFFFh space to option board use; the DDFEN or DDF enable signal and the DDFPGM or DDF program signal.

The output signals from the HA decode block 130 and the DDF control register 132 are provided to DDF map conversion circuitry 134. Additionally, the DDF map conversion circuitry 134 receives various other signals such as the MEM_DEC signal, which represents when active that HA<30-25> are all low or zero; the HA<31, 19, 2> signals; the HW/R signal, the host bus 28 version of the write/read signal; the HM/IO signal, the host bus 28 version of the memory/I/O signal; the DHLOCMEM* signal; the DHWP signal and the DHNCA signal. In turn, the DDF map conversion circuitry 134 produces the HLOCMEM*, HWP and HNCA signals, which are provided to the memory controller 102 and the bus controller 100 for proper selection and control of the local memory or memory on the ISA bus 36. The bus controller 100 controls non-local memory cycles which are directed to the ISA bus 36, while the memory control 102 controls local memory cycles which are directed to the memory system M.

The circuitry in the DDF map conversion circuitry 134 utilizes the given inputs and provides outputs as shown in the following four tables:

TABLE 1

Boot Mode (DDFEN = 0; DDFPGM = 0)

| HMIO | HWR | RELO# | WP# | WPO | HA31 | MEMDEC | HA19 | HA02 | HIGH_DEC | MID_DEC | COMMENTS |
|---|---|---|---|---|---|---|---|---|---|---|---|
| 0 | X | X | X | X | X | X | X | X | X | X | I/O Cycle |
| 1 | X | X | X | X | 0 | 0 | X | X | X | X | Out of DDF Range |
| 1 | X | X | X | X | 0 | 1 | 0 | X | X | X | Minimal (<512k) RAM |
| 1 | X | X | X | X | 0 | 1 | 1 | X | X | X | ROM/Video |
| 1 | X | X | X | X | 1 | 0 | X | X | X | X | Out of DDF range |
| 1 | X | X | X | X | 1 | 1 | X | X | X | X | Out of DDF range |

| LOW_DEC | C800_DEC | C80REN | DDFWE# | HLOCMEM# | HWP | HNCA | TA | RASEN | COMMENTS |
|---|---|---|---|---|---|---|---|---|---|
| X | X | X | X | 1 | 0 | 1 | S | S | I/O Cycle |
| X | X | X | 1 | 1 | 0 | 1 | S | S | Out of DDF Range |
| X | X | X | 1 | S | S | S | S | S | Minimal (<512k) RAM |
| X | X | X | 1 | 1 | 0 | 1 | S | S | ROM/Video |
| X | X | X | 1 | 1 | 0 | 1 | S | S | Out of DDF range |
| X | X | X | 1 | 1 | 0 | 1 | S | S | Out of DDF range |

Note:
S = Sourced by the DDF RAM 124
D = Sourced by the DDF Data Register 122
DDFEN = DDF Enable
DDFPGM = DDF Program
RELO# = ROM Relocate
WP# = ROM Write-protect
WPO = ROM Write-protect override
HIGH_DEC = Decode of HA[31:16] = XXFEh or XXFFh with HA31 = 1
MID_DEC = Decode of HA[31:16] = 00FFh or 00FEh
LOW_DEC = Decode of HA[31:16] = 000Fh
C800_DEC = Decode of HA[31:02] = 000C8000h to 000EFFFFh
C80REN = C800_DEC enable
DDFWE# = DDF RAM 124 write enable

TABLE 2

Programming Mode (DDFEN = 0; DDFPGM = 1)

| HMIO | HWR | RELO# | WP# | WPO | HA31 | MEMDEC | HA19 | HA02 | HIGH_DEC | MID_DEC | COMMENTS |
|---|---|---|---|---|---|---|---|---|---|---|---|
| 0 | X | X | X | X | X | X | X | X | X | X | I/O Cycle |
| 1 | X | X | X | X | X | 0 | X | X | X | X | Out of DDF range |
| 1 | X | X | X | X | 1 | 1 | X | X | X | X | Out of DDF range |
| 1 | 0 | X | X | X | 0 | 1 | X | X | X | X | Memory read |
| 1 | 1 | X | X | X | 0 | 1 | X | 0 | X | X | DDF programming write |
| 1 | 1 | X | X | X | 0 | 1 | X | 0 | X | X | DDF programming write |
| 1 | 1 | X | X | X | 0 | 1 | X | 1 | X | X | DDF programming read |

| LOW_DEC | C800_DEC | C80REN | DDFWE# | HLOCMEM# | HWP | HNCA | TA | RASEN | COMMENTS |
|---|---|---|---|---|---|---|---|---|---|
| X | X | X | X | 1 | 0 | 1 | S | S | I/O Cycle |
| X | X | X | 1 | 1 | 0 | 1 | S | S | Out of DDF range |
| X | X | X | 1 | 1 | 0 | 1 | S | S | Out of DDF range |
| X | X | X | 1 | 1 | 1 | 0 | S | S | Memory read |
| X | X | X | 1 | 0 | 0 | 1 | S | S | DDF programming write |
| X | X | X | 0 | D | D | D | D | D | DDF programming write |
| X | X | X | 1 | S | S | S | S | S | DDF programming read |

TABLE 3

Operational Mode (DDFEN = 1; DDFPGM = 0)

| HMIO | HWR | RELO# | WP# | WPO | HA31 | MEMDEC | HA19 | HA02 | HIGH_DEC | MID_DEC | COMMENTS |
|---|---|---|---|---|---|---|---|---|---|---|---|
| 0 | X | X | X | X | X | X | X | X | X | X | I/O Cycle |
| 1 | X | X | X | X | X | 0 | X | X | X | X | Out of DDF range |
| 1 | X | X | X | X | 1 | 1 | X | X | X | X | Out of DDF range |
| 1 | X | X | X | X | 0 | 1 | X | X | 0 | 0 | Normal Access |
| 1 | X | X | 1 | X | 0 | 1 | X | X | X | 1 | Non-WP 00FE–00FF ROM |
| 1 | X | X | 0 | 0 | 0 | 1 | X | X | X | 1 | WP 00FE–00FF ROM |
| 1 | X | X | 0 | 1 | 0 | 1 | X | X | X | 1 | WP-override 00FE+ ROM |
| 1 | X | 1 | 1 | X | 0 | 1 | X | X | X | X | Non-Relocated 000F ROM |
| 1 | X | 0 | 1 | X | 0 | 1 | X | X | X | X | Relocated 000F ROM |
| 1 | X | 1 | 0 | X | 0 | 1 | X | X | X | X | Non-Relo/WP 000F ROM |
| 1 | X | 0 | 0 | X | 0 | 1 | X | X | X | X | Relocated/WP 000F ROM |
| 1 | X | X | X | X | 0 | 1 | X | X | X | X | Allow C8000+ local |
| 1 | X | X | X | X | 0 | 1 | X | X | X | X | Force C8000+ non-local |

| LOW_DEC | C800_DEC | C80REN | DDFWE# | HLOCMEM# | HWP | HNCA | TA | RASEN | COMMENTS |
|---|---|---|---|---|---|---|---|---|---|
| X | X | X | X | 1 | 0 | 1 | S | S | I/O Cycle |
| X | X | X | 1 | 1 | 0 | 1 | S | S | Out of DDF range |
| X | X | X | 1 | 1 | 0 | 1 | S | S | Out of DDF range |
| 0 | 0 | X | 1 | S | S | S | S | S | Normal Access |
| X | X | X | 1 | S | S | S | S | S | Non-WP 00FE–00FF ROM |
| X | X | X | 1 | S | 1 | 0 | S | S | WP 00FE–00FF ROM |
| X | X | X | 1 | S | S | S | S | S | WP-override 00FE+ ROM |
| 1 | X | X | 1 | 1 | 1 | 0 | S | S | Non-Relocated 000F ROM |
| 1 | X | X | 1 | S | S | S | S | S | Relocated 000F ROM |
| 1 | X | X | 1 | 1 | 1 | 0 | S | S | Non-Relo/WP 000F ROM |
| 1 | X | X | 1 | S | 1 | 0 | S | S | Relocated/WP 000F ROM |
| X | 1 | 0 | 1 | S | S | S | S | S | Allow C8000+ local |
| X | 1 | 1 | 1 | 1 | 0 | 1 | S | S | Force C8000+ non-local |

TABLE 4

On-The-Fly Programming Mode (DDFEN = 1; DDFPGM = 1)

| HMIO | HWR | RELO# | WP# | WPO | HA31 | MEMDEC | HA19 | HA02 | HIGH_DEC | MID_DEC | COMMENTS |
|---|---|---|---|---|---|---|---|---|---|---|---|
| 0 | X | X | X | X | X | X | X | X | X | X | I/O Cycle |
| 1 | X | X | X | X | X | 0 | X | X | X | X | Out of DDF range |
| 1 | X | X | X | X | 1 | 1 | X | X | X | X | Out of DDF range |
| 1 | 0 | X | X | X | 0 | 1 | X | X | 0 | 0 | Normal Read |
| 1 | 1 | X | X | X | 0 | 1 | X | 0 | X | X | DDF Programming Write |
| 1 | 1 | X | X | X | 0 | 1 | X | 0 | X | X | DDF Programming Write |
| 1 | 1 | X | X | X | 0 | 1 | X | 1 | X | X | DDF Programming Read |
| 1 | 0 | X | 1 | X | 0 | 1 | X | X | X | 1 | Non-WP 00FE–00FF ROM |
| 1 | 0 | 0 | 0 | 0 | 0 | 1 | X | X | X | 1 | WP 00FE–00FF ROM |
| 1 | 0 | X | 0 | 1 | 0 | 1 | X | X | X | 1 | WP-override 00FE+ ROM |
| 1 | 0 | 1 | 1 | X | 0 | 1 | X | X | X | X | Non-Relocated 000F ROM |
| 1 | 0 | 0 | 1 | X | 0 | 1 | X | X | X | X | Relocated 000F ROM |
| 1 | 0 | 1 | 0 | X | 0 | 1 | X | X | X | X | Non-Relo/WP 000F ROM |
| 1 | 0 | 0 | 0 | X | 0 | 1 | X | X | X | X | Relocated/WP 000F ROM |
| 1 | 0 | X | X | X | 0 | 1 | X | X | X | X | Allow C8000+ local |
| 1 | 0 | X | X | X | 0 | 1 | X | X | X | X | Force C8000+ non-local |

| LOW_DEC | C800_DEC | C80REN | DDFWE# | HLOCMEM# | HWP | HNCA | TA | RASEN | COMMENTS |
|---|---|---|---|---|---|---|---|---|---|
| X | X | X | X | 1 | 0 | 1 | S | S | I/O Cycle |
| X | X | X | 1 | 1 | 0 | 1 | S | S | Out of DDF range |

TABLE 4-continued

| | | | | On-The-Fly Programming Mode (DDFEN = 1; DDFPGM = 1) | | | | | |
|---|---|---|---|---|---|---|---|---|---|
| X | X | X | 1 | 1 | 0 | 1 | S | S | Out of DDF range |
| 0 | 0 | X | 1 | S | S | S | S | S | Normal Read |
| X | X | X | 1 | 0 | 0 | 1 | S | S | DDF Programming Write |
| X | X | X | 0 | D | D | D | D | D | DDF Programming Write |
| X | X | X | 1 | S | S | S | S | S | DDF Programming Read |
| X | X | X | 1 | S | S | S | S | S | Non-WP 00FE–00FF ROM |
| X | X | X | 1 | S | 1 | 0 | S | S | WP 00FE–00FF ROM |
| X | X | X | 1 | S | S | S | S | S | WP-override 00FE+ ROM |
| 1 | X | X | 1 | 1 | 1 | 0 | S | S | Non-Relocated 000F ROM |
| 1 | X | X | 1 | S | S | S | S | S | Relocated 000F ROM |
| 1 | X | X | 1 | 1 | 1 | 0 | S | S | Non-Relo/WP 000F ROM |
| 1 | X | X | 1 | S | 1 | 0 | S | S | Relocated/WP 000F ROM |
| X | 1 | 0 | 1 | S | S | S | S | S | Allow C8000+ local |
| X | 1 | 1 | 1 | 1 | 0 | 1 | S | S | Force C8000+ non-local |

These tables correspond to the four possible modes of operation of the DDF logic 104 and also incorporate the various cases of the relocation and write protect bits. The first mode of operation is the boot mode which is set initially upon reset and boot-up of the computer system C. This mode is used only for a very short period of time. In this mode the BIOS is being provided out of ROM which is located in the actual address of F0000h, above 512 kbyte boundary operations. In this mode some of the first operations in the ROM as disclosed in the flow charts described below are performed. The operations program the DDF RAM 124 for normal operation. Programming mode is shown in Table 2. After programming is completed, the DDFEN bit is set to 1 and the DDFPGM bit is set to 0, so that full operational or normal operational mode is set. This is shown in Table 3. In addition, operation according to Table 4 allows an alternative where the DDF is both operational and can be programmed at one time. The caveat here is that all writes occur only to the H bus 28, so that no write operations to the memory or ISA buses are actually developed, but this mode allows fast development and use of a remapped or relocated ROM and reprogramming of the DDF after operational mode has been entered.

Equations which may be utilized to develop the above four tables are shown below:

```
HLOC_SEL = HM/IO & HA31* & MEM_DEC &
           ((BOOT_MODE & HA19*) +
           (PROG_MODE & HW/R & (DDFOE* & DDFWE*)*) +
           (OP_MODE & ((LOW_DEC & RELO) +
                      (HI_DEC* & LOW_DEC* & C800_DEC*) +
                      (C800_DEC & C80REN*))) +
           (FLY_MODE & ((HW/R & (DDFOE* & DDFWE*)*) +
                      (HW/R* & ((HI_DEC* & LOW_DEC* &
                                 C800_DEC*) +
                                (LOW_DEC & RELO) +
                                (C800_DEC & C80REN*))))))
PU_HLOC = BOOT_MODE +
           ((PROG_MODE + FLY_MODE) &
           (HM/IO & HA31* & MEM_DEC & HW/R & DDFOE* & DDFWE*)*) +
           (OP_MODE & (HM/IO* + (HM/IO & ((HA31* & MEM_DEC)* +
                      ((HA31* & MEM_DEC) &
                      ((RELO* & LOW_DEC) +
                      (C800_DEC & *C80REN))))))
HLOCMEM* = (HLOC_SEL & DHLOCMEM*) + (HLOC_SEL* & PU_HLOC)
HWP_SEL = HM/IO & HA31* & MEM_DEC. &
           ((BOOT_MODE & HA19*) +
           ((PROG_MODE + FLY_MODE) & HW/R & (DDFOE* & DDFWE*)*) +
           (OP_MODE & ((HI_DEC* & MID_DEC* &
                      LOW_DEC* & C800_DEC*) +
                      (LOW_DEC & RELO & WP*) +
                      (MID_DEC & (WP* + WPO)) +
                      (C800_DEC & C80REN*))) +
           ((FLY_MODE & HW/R*) & ((HI_DEC* & MID_DEC* &
                      LOW_DEC* & C800_DEC*) +
                      (LOW_DEC & RELO & WP*) +
                      (MID_DEC & (WP* + (WP & WPO))) +
                      (C800_DEC & C80REN*))))
PU_HWP = BOOT_MODE* & ((PROG_MODE & HM/IO & HA31* &
           MEM_DEC & HW/R*) +
           (OP_MODE & HM/IO & HA31* MEM_DEC &
```

-continued

```
            ((WP & LOW_DEC) +
            (WP* & RELO* & LOW_DEC) +
            (WP & WPO* & MID_DEC))) +
         (FLY_MODE & HM/IO & HA31* & MEM_DEC &
         HW/R* & ((MID_DEC & WP & WPO*) +
            (LOW_DEC & (RELO* +
                (RELO & WP))))))
HWP = (HWP_SEL & DHWP) + (HWP_SEL* & PU_HWP)
HNCA = (HWP_SEL & DHNCA) + ( HWP_SEL* & PU_HWP*)
```

Figure 5:
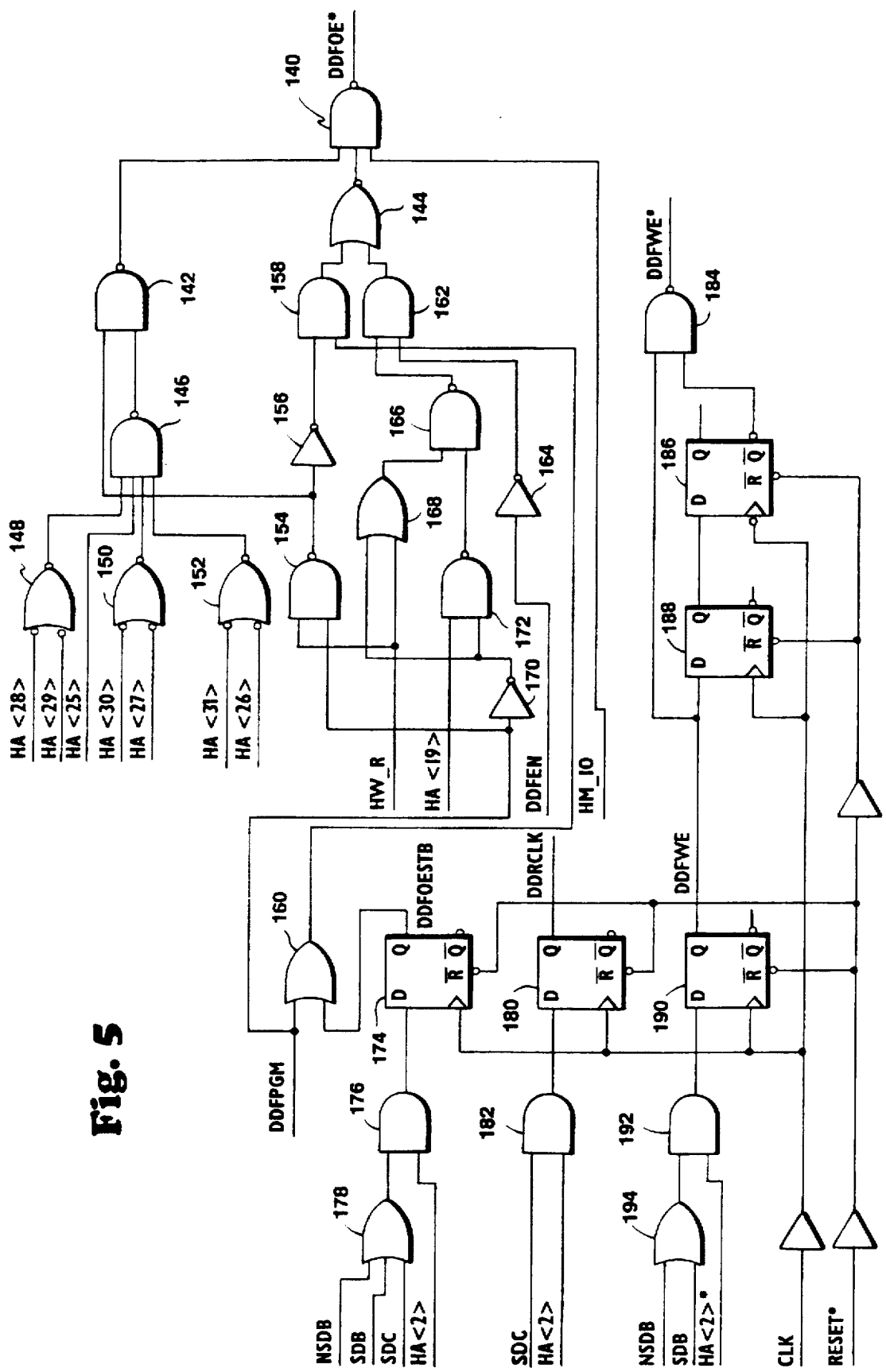
FIG. 5 is a schematic diagram of portions of the DDF control circuitry 120 of FIG. 3.
Figure 6:
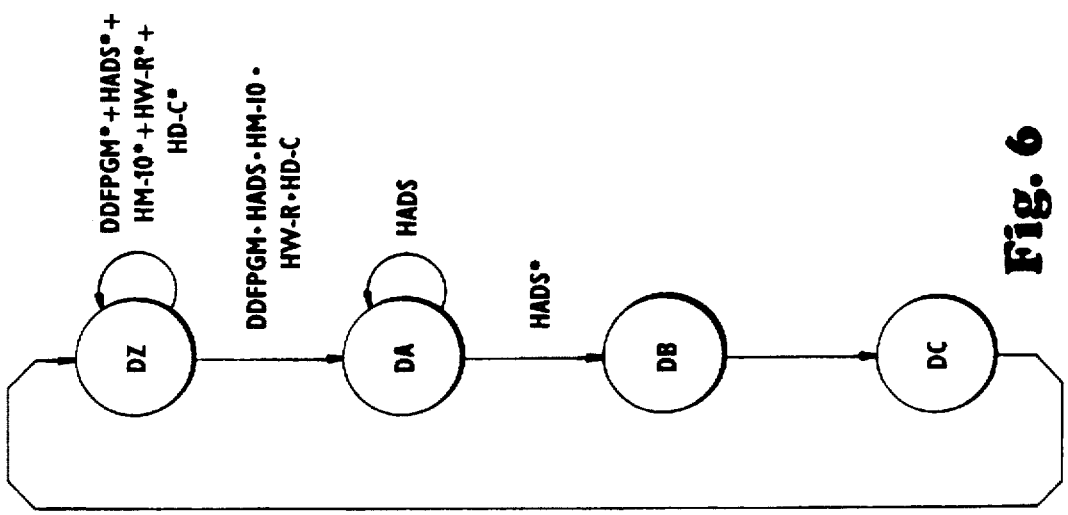
FIG. 6 is a state machine of operation of portions of the DDF control circuitry 120 of FIG. 3.

FIG. 5 shows additional circuitry utilized in the DDF control circuitry 120 to control the DDF RAM 124 and the DDF data register 122. The logic of FIG. 5 works in conjunction with the state machine of FIG. 6. Operation of the state machine is as follows. The state machine has four states, with the states being advanced or possibly changed based on the falling edge of the CLK signal. At reset the state machine starts at state DZ. It remains in state DZ if the DDFPGM signal is low, the HADS* or host bus address status signal is high, the HM/IO signal is low, the HW/R signal is low or the HD/C or host bus data/code signal is low. Thus, it stays in this idle state if DDF programming mode is not enabled and a memory data write operation is not occurring. When the DDF program mode is enabled, a memory write data operation is occurring and the address status strobe is low, then on the falling CLK signal edge control proceeds to state DA. Control loops at state DA while the HADS* signal is low and proceeds to state DB on the CLK signal falling edge after the HADS* signal has returned high. The state machine proceeds through states DB and DC on the proceeding CLK signal falling edges and returns to state DZ.

Returning now to FIG. 5, the first signal of interest is the DDFOE* signal. This is produced by the output of a three input NAND gate 140. One input to the NAND gate 140 is the HM/IO signal. The second input is the output of a two input NAND gate 142. The third input is the output of a two input NOR gate 144. One input to the NAND gate 142 is provided by the output of a four input NAND gate 146 whose inputs are connected to the output of two input NAND gates 148, 150 and 152 and the HA<25> signal. The NAND gates 148, 150 and 152 receive the address bits HA<31-26>. The second input to the NAND gate 142 is provided by the output of a two input NAND gate 154. One input to the NAND gate 154 is HW/R signal, while the other is the DDFPGM signal. Thus the output of the NAND gate 142 is active for accesses to the lower 32 Mbytes or during DDF read operations.

The output of the NAND gate 154 is also provided to the input of an inverter 156 whose output is connected to one input of a two input AND gate 158, whose output in turn is one input to the NOR gate 144. The second input to the AND gate 158 is provided by the output of an OR gate 160, whose inputs are the DDFPGM signal and a signal referred to as DDFOESTB which is a strobe to indicate that a DDF RAM output is appropriate.

The second input to the NOR gate 144 is provided by the output of a two input AND gate 162. One input to the AND gate 162 is provided by the output of an inverter 164 whose input receives the DDFEN signal. The other input of the AND gate 162 is provided by the output of a two input NAND gate 166. One input of the NAND 166 is provided by the output of a two input OR gate 168. The OR gate 168 receives the HW/R signal and the output of an inverter 170 which receives at its input the DDFPGM signal. The output of the inverter 170 and the HA<19> signal are the two inputs to a two input NAND gate 172 whose output is the second input to the NAND gate 166. Thus the output of NOR gate 144 is active during the proper portion of DDF read operations and during non-programming operations when enabled.

The DDFOESTB signal is provided as the output of a D-type flip-flop 174. The clock input to the flip-flop 174 is provided by the CLK signal, while the inverted reset input is connected to the RESET* or system reset signal. The D input of the flip-flop 174 is connected to the output of a two input AND gate 176, one input of which is the HA<2> signal while the other input of which receives the output of a three input OR gate 178. The three inputs to the OR gate 178 are signals indicating that the next state of the state machine is state DB, that the state machine is in state DB and that the state machine is in state DC. In this manner a strobe is provided at the appropriate time for use by the DDF RAM 124.

It is also necessary to develop the DDRCLK signal which is used to strobe data into the DDF data register 122 from the DDF RAM 124 when a DDF read operation is occurring. The DDRCLK signal is provided by the non-inverted output of a D-type flip-flop 180, whose clock input is connected to the CLK signal and whose inverted reset input is connected to the RESET* signal. The D input of the flip-flop 180 is connected to the output of a two input AND gate 182 whose inputs are the HA<2> signal and the state machine state DC signal.

The final DDF signal of interest is the DDFWE* signal which is produced as the output of a two input NAND gate 184. One input of the NAND gate 184 is connected to the inverted output of a D-type flip-flop 186. The inverted clock input of the flip-flop 186 is connected to the CLK signal, while the inverted reset input is connected to the RESET* signal. The D input of the flip-flop 186 is connected to the non-inverted output of a D-type flip-flop 188, whose non-inverted clock input is connected to the CLK signal and whose inverted reset input is connected to the RESET* signal. The second input of the NAND gate 184 is connected to the D input of the flip-flop 188, which is also connected to the non-inverted output of a D-type flip-flop 190. The clock input of the flip-flop 190 is connected to the CLK signal, while the inverted reset input is connected to the RESET* signal. The D input of the flip-flop 190 is connected to the output of a two input AND gate 192, one input of which receives the HA<2>* signal and the other input of which receives the output of a two input OR gate 194. The inputs to the OR gate 194 are the next state DB and current state DB signals. Therefore the DDFWE* signal is provided only at the proper times during DDF write operations.

Figure 7:
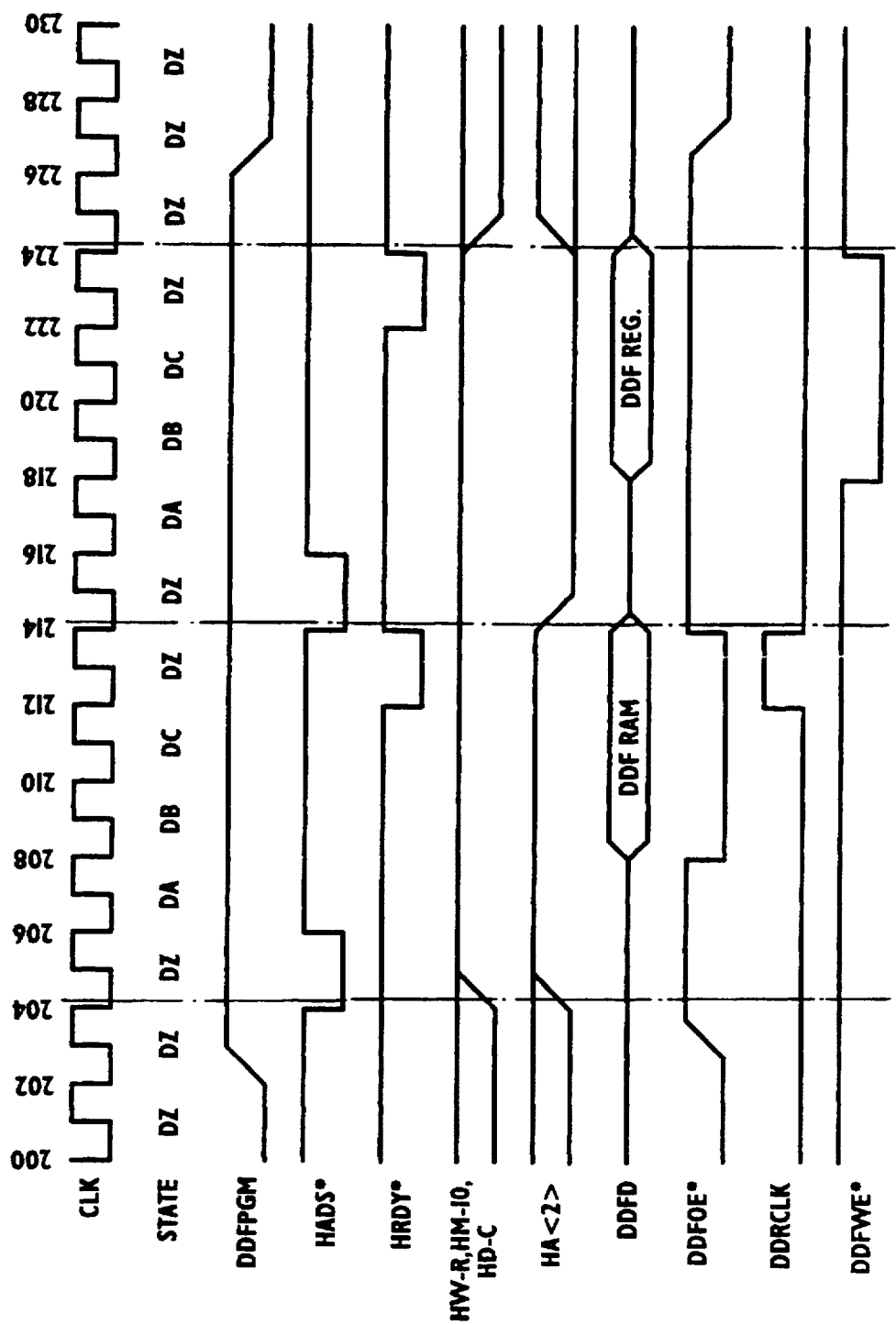
FIG. 7 is a timing diagram of operations of the DDF control circuitry 120 of FIG. 3.

The timing of the various signals is shown in FIG. 7. Shown in FIG. 7 is one cycle where the DDF RAM 124 is read and one cycle where the DDF RAM 124 is programmed. The cycles shown are back-to-back DDF read and DDF write operations which would not occur naturally but are shown for illustrative purposes. At time 200, a falling edge of the CLK signal, the DDFPGM signal is considered to be low and various operations are occurring. At time 202, the next falling edge of the CLK signal, the state machine stays at state DZ because the DDFPGM* signal is high. At time 202, the DDFPGM signal begins changing state as would be done after an I/O operation to the DDF data register 122 setting the DDFPGM bit. Shortly thereafter, the DDFOE* signal begins a transition from a low state to a high state because DDF programming is commencing, disabling the operation of the DDF RAM 124. During DDF programming the DDF mapping is essentially disabled so that all memory accesses must be made out of the lower 128 kbyte block of memory or above the 32 Mbyte limits of the DDF as discussed. At time 204, the next falling edge of the CLK signal, on which signal the DDF state machine advances, the state machine stays in state DZ because the HADS* signal was high when the edge occurred. At time 204, the DDFPGM signal is high and the HADS* signal goes low, which is an indication that a valid address is present or being presented on the host bus 46. By time 206, the next falling edge of the CLK signal, the HW-R, HM-IO and HD-C signals are all high, in the example indicated the HA<2> signal is high, the DDFPGM signal is high and the HADS* signal is low. Therefore on this edge the state machine advances to state DA.

At time 208, the next falling edge of the CLK signal, the DDFOE* signal goes low because the next state of the state machine will be state DB, because the HADS* signal is high. Therefore at time 208, the state machine advances to state DB and the DDFOE* signal goes low. Because the DDFOE* signal goes low, data produced by the DDF RAM 124 begins being provided to the DDF data register 122. At time 210, the next falling edge of the CLK signal, the state machine is in state DB so that the DDFOE* signal stays low and the state machine proceeds to state DC. At time 212, the next falling edge of the CLK signal, the HRDY* or host bus ready signal goes low to indicate to the bus controller 100 that the next cycle can commence and the DDRCLK signal goes high to latch the DDF data, which has been presented by the DDF RAM 124, into the DDF data register 122. The data will be valid because in the preferred embodiment 20 nsec memory devices are utilized and the CLK signal cycle is 30 or 40 nsec. Because the state machine was in state DC, at time 212 the state machine transfers to state DZ. The DDFOE* signal stays low because state DC had been present at the falling edge of the CLK signal, the completion of the DDF read operation, the DDRCLK signal goes low, the DDFOE* signal goes high, the HRDY* signal goes high and the HADS* signal goes low. The state machine stays at state DZ because the HADS* signal is high prior to the falling edge of the CLK signal at time 214.

An operational mode cycle would have similar timing, except that the DDFPGM signal would be low. Additionally, the HRDY* signal could occur at other times because it would be provided by the bus controller 100 in response to normal operations and the HA<2> would be as desired for the operation. Additionally the state machine would stay in state DZ.

Proceeding now to the DDF write operation commencing at time 216, the falling edge of the CLK signal, the HADS* signal goes high. The state machine proceeds to state DA because the transfer conditions are met. Also at time 216, the HA<2> signal has changed to a low value indicating that a write operation will be occurring. At time 218, the next falling edge of the CLK signal, the DDFWE* signal goes low and the data which is contained in the DDF data register 122 is presented to the DDF RAM 124. The DDFWE* signal goes low because the next state of the state machine will be state DB and the HA<2> signal is low, indicating that a DDF write operation is to occur. At time 218 the state machine advances to state DB. At time 220, the next falling edge of the CLK signal, the state machine advances to state DZ and the HRDY* signal goes low, indicating that the cycle is completing. At time 224, the next falling edge of the CLK signal, the DDFWE* signal goes high, which causes the DDF RAM 124 to latch in the values which have been presented. The HRDY* signal goes high and the next appropriate cycle is performed by the computer system C. The state machine stays in state DZ until the next DDF programming cycle is to be started.

Figure 8:
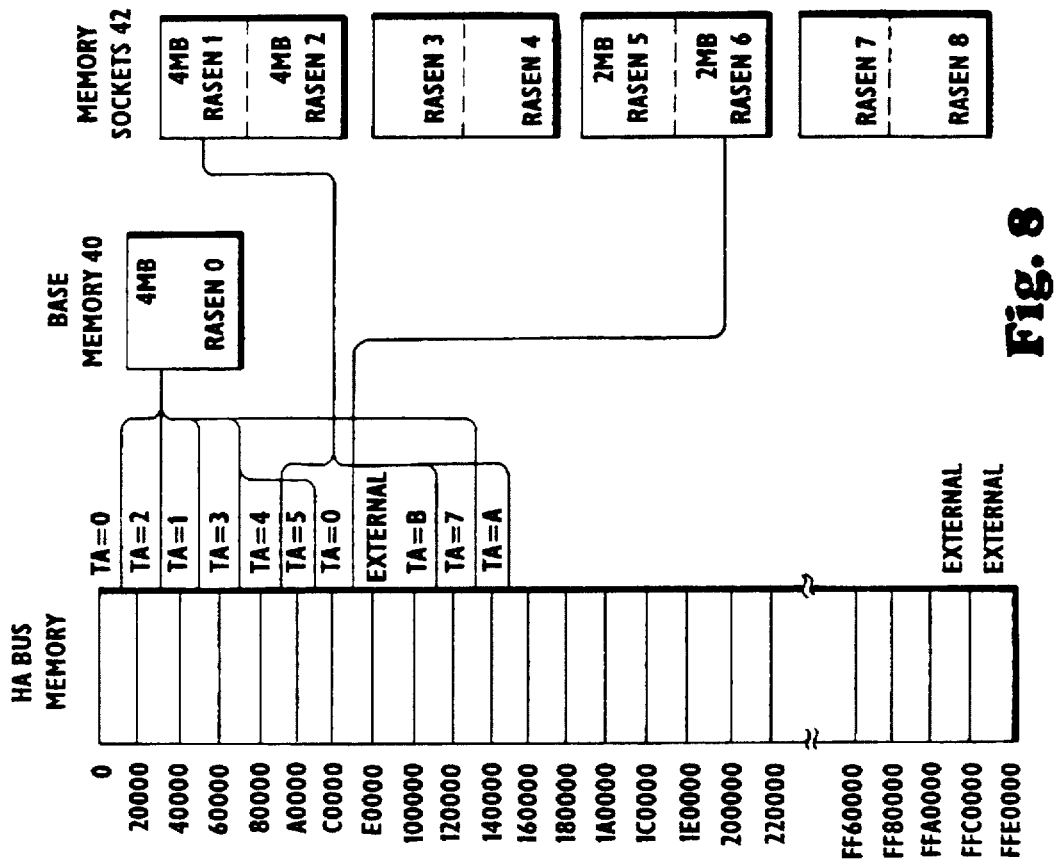
FIG. 8 is a representation of the logical to physical relationship of the present invention.

FIG. 8 shows a representative mapping of the address which is to appear on the HA address lines <31-2> of the host address bus 28 with the appropriate desired map of the TA values and the RASEN values. In this description address and RASEN values are referenced in hexadecimal notation, while bit locations in a bus and memory sizes are referred to in decimal notation. For example, the first 128 kbyte block from address 0 to 20000h is remapped to have a TA value equal to 0 and a RASEN value equal to 0, so that it is mapped into the first 128 kbyte block of the base memory 40. The next 128 kbyte block of memory from 20000h to 40000h is mapped to the TA value equal to 2 and a RASEN value equal to 0 so that the third 128 kbyte block of the base memory 40 is addressed. The third 128 kbyte memory space from address 40000h to 60000h is mapped so that a TA value of 1 is present and an RASEN value of 0 is present so that the second 128 kbyte block of the base memory 40 is accessed for this memory range. Thus it can be seen that the blocks in the memory need not be taken in order but can be taken out of order as desired. The fourth 128 kbyte block of memory from address 60000h to 80000h receives a TA value of 3 and a RASEN value of 0.

In FIG. 8, the next 128 kbyte block of memory from address 80000h to A0000h receives a TA value of 4 but an RASEN value of 1 so that the fifth 128 kbyte block in the first half of the first memory socket 42 is accessed for this particular memory value block. For the memory block from address A0000h to C0000h a TA value of 5 is applied as well as an RASEN value of 0, so that the sixth 128 kbyte block of the base memory 40 is utilized. It has been noted that the fifth 128 kbyte block of the base memory 40 has been skipped, for example because it is bad. The memory address block from address C0000h to E0000h receives a TA value equal to 0 and an RASEN value equal to 6 so that the first 128 kbyte block of the second half of the third memory socket 42 is accessed. The 128 kbyte memory block from address E0000h to 100000h is classified to be external by having the HLOCMEM* signal high, so that no values need to be programmed to the TA or RASEN bits because they will not be utilized in this operation. This address range is then handled by external memory, such as that present on boards located in the ISA slots 50. As can be seen this process continues as shown in FIG. 8 so that various forms of remapping are possible as desired, so that particular blocks can easily be programmed around and the modules need not be located in a sequential order having memory sizes in particular order. The system C with the present invention can utilize all the memory which is readily available without requiring the user to consult special tables or otherwise have restrictions on its physical location and the size ordering.

Figure 9A:
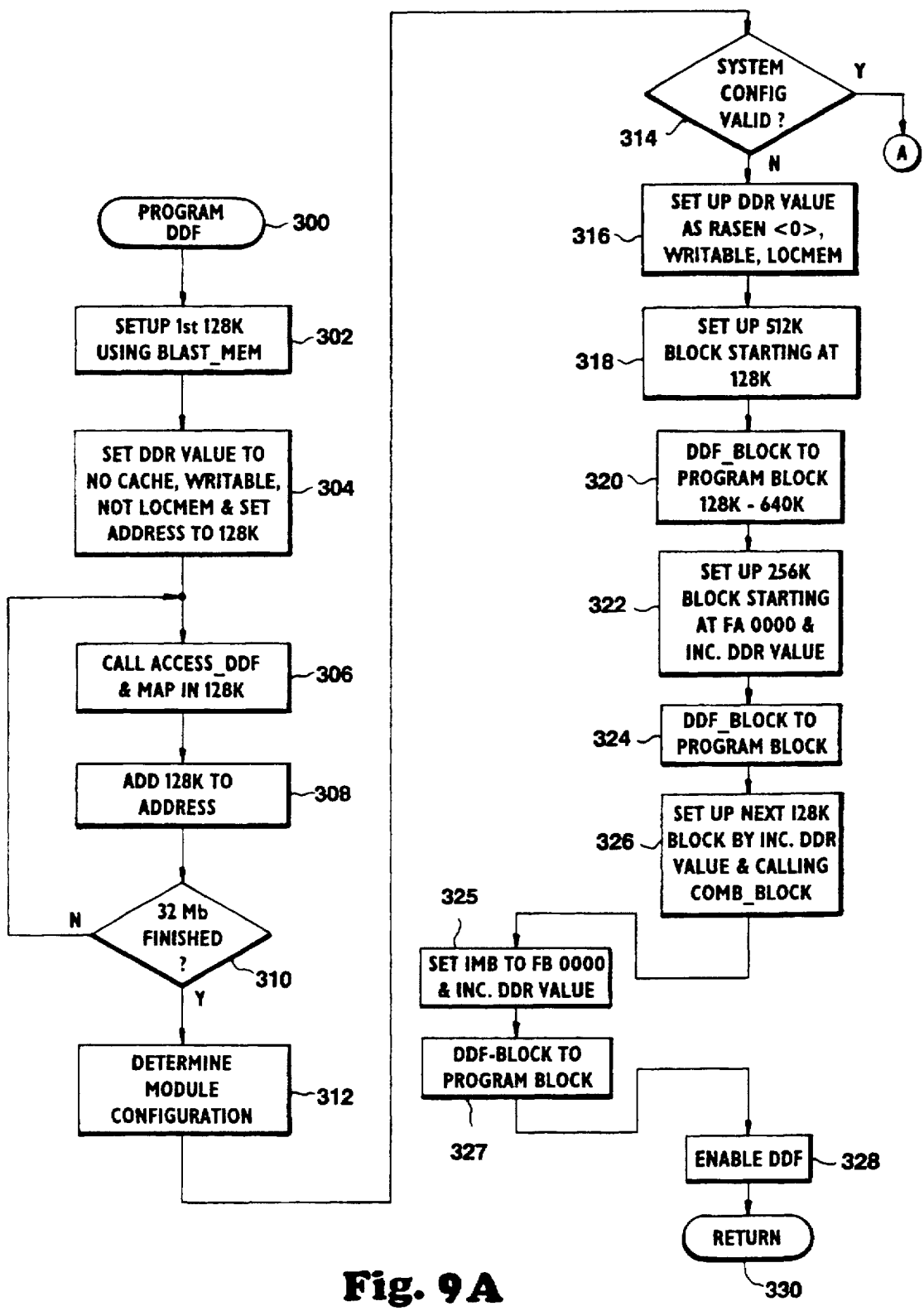
FIGS. 9a, 15, or 16 are flow chart illustrations of the operation of software incorporating the present invention.
Figure 16:
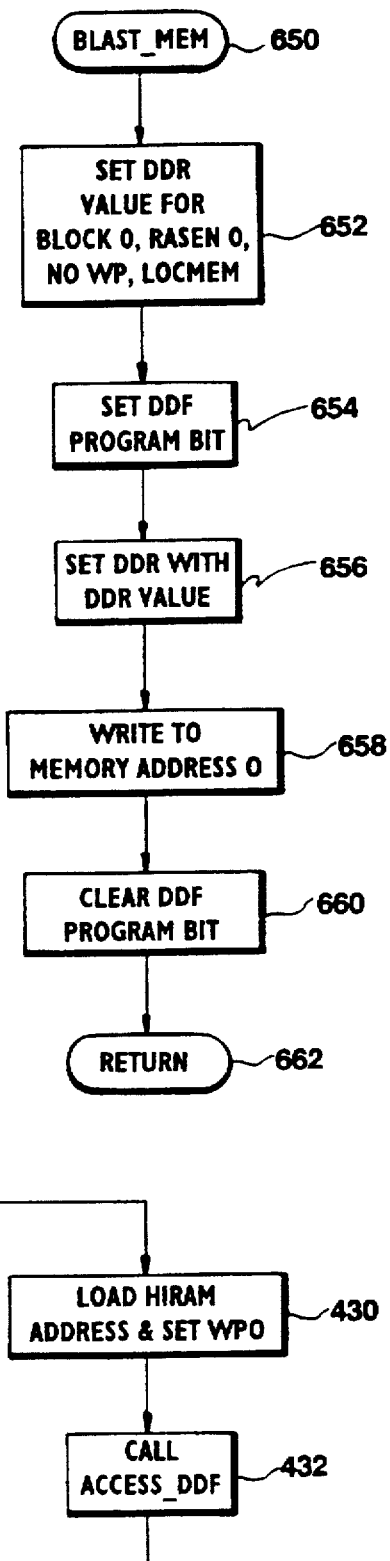
Figure 14:
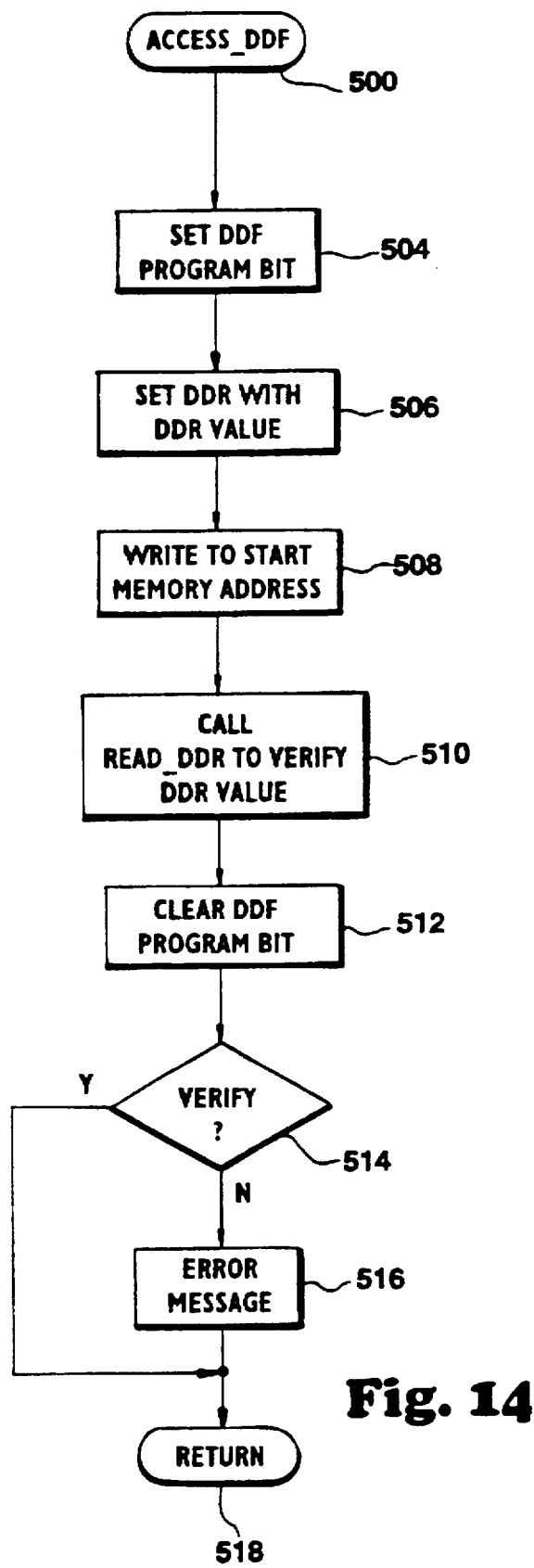

Because the DDF data is contained in a RAM, it is necessary to program the RAM after powerup or reset of the system. It is also desirable that the RAM be programmable during other periods to allow users to vary their system design. A sequence suitable to be used during the power on self-testing (POST) portion in the initialization of the computer system C is the PROGRAM DDF sequence 300 (FIG. 9A). It is noted that this sequence is entered with the DDF logic 104 in boot mode. The PROGRAM DDF sequence 300 commences at step 302 where the first 128 kbyte bank of the base memory 40 is set up to be local memory and writable by using the BLAST_MEM sequence 650 (FIG. 16). This operation thus sets up a minimum amount of RAM for utilization during the initialization sequences. In step 304, a DDF data register (DDR) value which is stored in the computer system C is set to noncacheable, writable, external memory mode and an address pointer is set to point to the beginning of the second 128 kbyte block. Control proceeds to step 306, where a subroutine called ACCESS_DDF 500 (FIG. 14) is called which performs the actual programming of the DDF values to the address indicated by the address pointer. In step 306, this operation is performed for 128 kbyte block. Control then proceeds to step 308, where 128 kbytes is added to the address pointer to address the next address block. In step 310 a determination is made as to whether 32 Mbytes, the limit of the DDF facility in the preferred embodiment, has been programmed to this default value. If not, control returns to step 306 and the default programming continues. If all of the 32 Mbytes have been completed so that the DDF RAM 124 is loaded with default values, effectively disabling the main memory except for the first 128 kbyte block, then control proceeds to step 312 where the actual configuration of the installed base memory 40 and memory modules is determined. The location and sizes are determined for use in the programming the DDF RAM 124. This information can be obtained by reading information available from the memory modules or by trying various combinations of parameters with the memory modules. Control proceeds to step 314, where a determination is made to see if the system configuration information, which is contained in CMOS memory, is valid. The system configuration information contains information such as where bad memory blocks are located, how much memory is actually installed in the system, logical address ranges of the memory and various characteristics of the memory.

Figure 13:
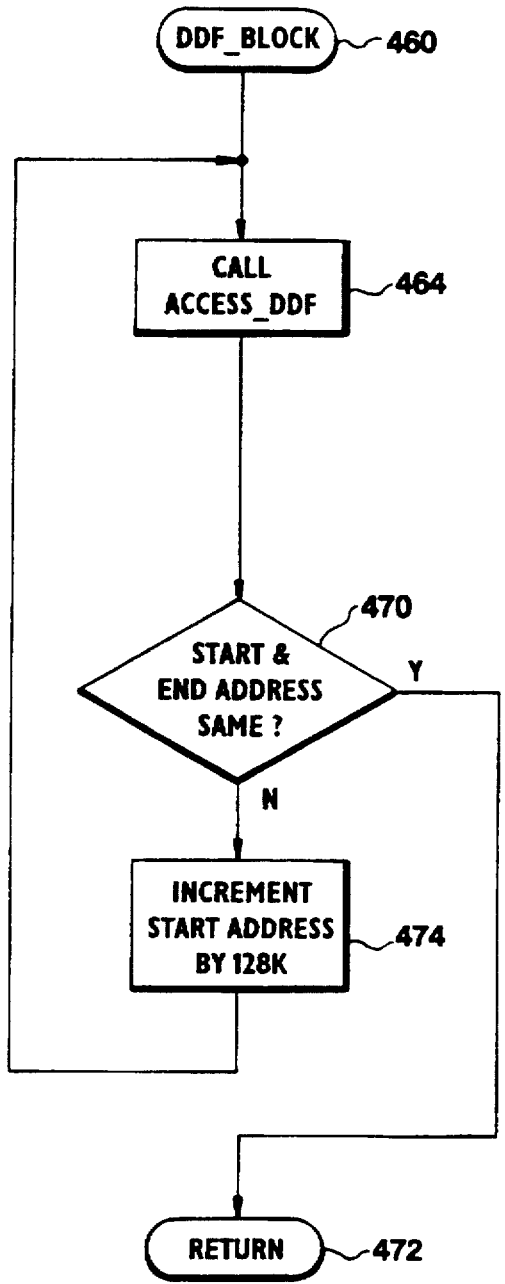

If the configuration information is not valid, a default memory configuration must be programmed, so control proceeds to step 316 where a DDR value which addresses the base memory 40 and sets the memory as writable and local is developed. In step 318, the address pointer is moved to point to the second 128 kbyte block with an ending address pointer set up so that an additional 512 kbytes of memory is programmed with the desired preset DDF values, resulting in 640 kbytes base memory available to the user. The programming operation is performed in step 320 by a call to the DDF_BLOCK sequence 460 (FIG. 13). In step 322 the 256 kbyte block starting at address FA0000h is developed and the DDR TA value is incremented, so that this memory space is available for the user. Preferably the TA values are the low bits in the DDR values so that simple incrementing can be used as each block is completed. The appropriate DDR value is programmed in using the DDF_BLOCK sequence 460 in step 324. Finally, in step 326, a final 128 kbyte block is developed by incrementing the DDR value and calling the COMB_BLOCK routine 400 (FIG. 10) which programs a single 128 kbyte block to be used for the RAM copy of the BIOS ROM. Thus, 640 kbytes of base memory and 384 kbytes of system memory has been programmed. Control proceeds to step 325, where an address block of from 100000h to F80000h is set up and the DDR value incremented. In step 327 the DDF_BLOCK sequence 460 is called to program this large block as writable and local. Control proceeds to step 328 where the DDF enable bit is set, thus activating the DDF section. Control proceeds to step 330 which is a return to the calling routine.

Figure 9B:
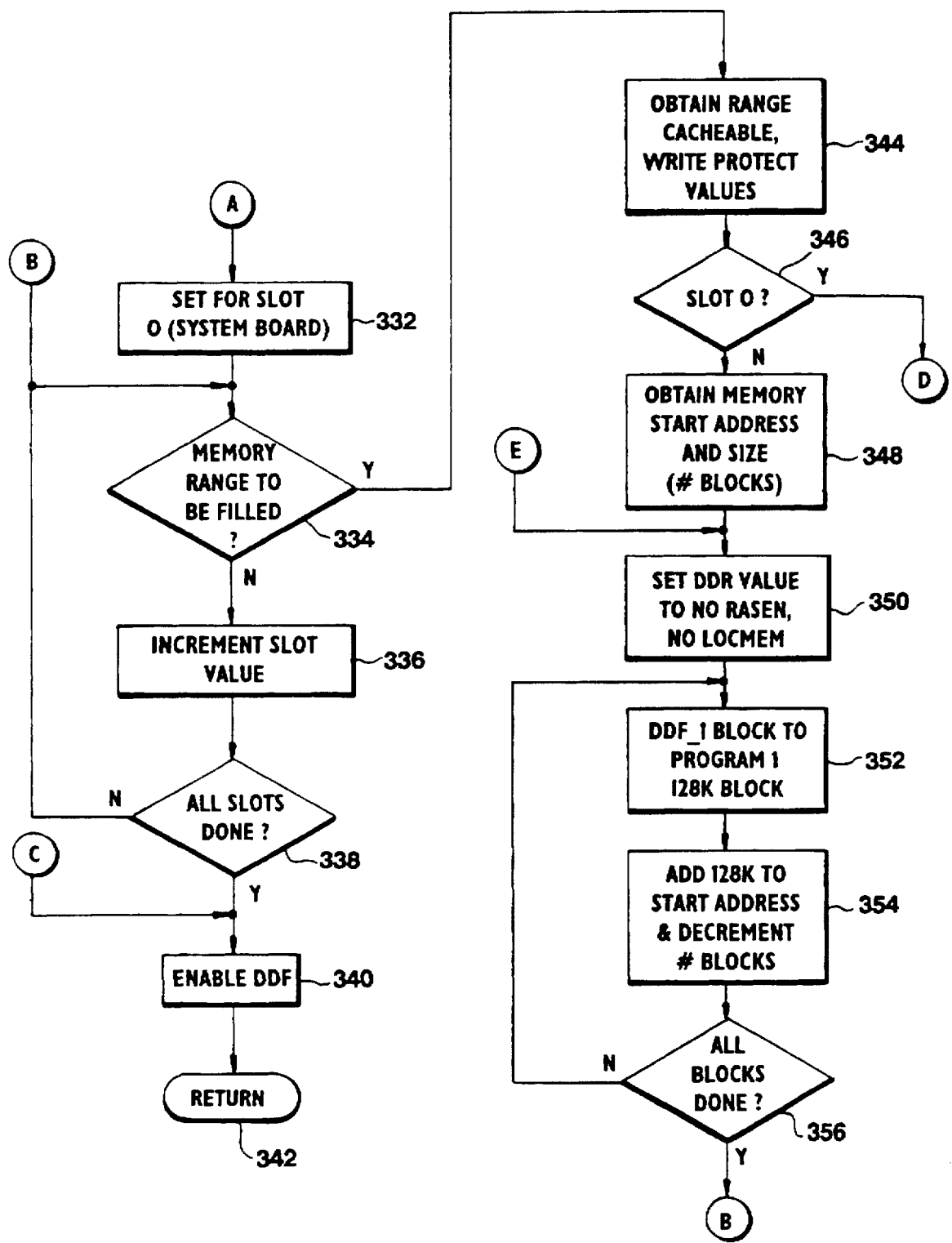

If, in step 314, it was determined that the system configuration information was valid, control proceeds to step 332 (FIG. 9B) where a pointer is set to indicate slot 0, which is the system board in the preferred embodiment. This slot counter is to be utilized in checking through the various information stored in the system configuration information to find information relating to the RAM that is present in the computer system C. Control proceeds to step 334 where a determination is made if there is a memory range to be filled in that particular slot. If not, control proceeds to step 336 where the slot value is incremented to proceed to the next possible slot. In step 338, a determination is made if all of the slots have been evaluated. If not, control returns to step 334. If all of the slots have been evaluated, then control proceeds to step 340, where the DDFEN bit is set, thus enabling the DDF function. Control proceeds to step 342 for a return to the calling sequence, which results in the POST sequence continuing.

Figure 11:
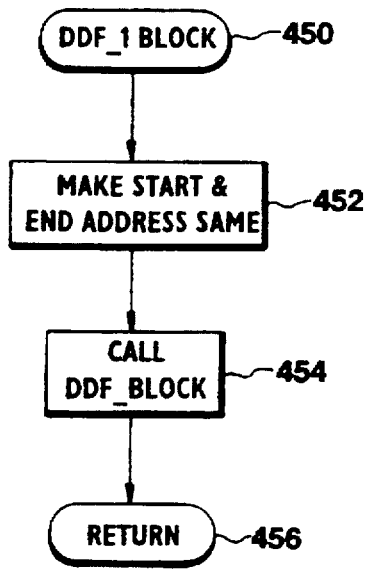

If in step 334 it was determined that there was a memory range to be filled, control proceeds to step 344 where the sequence determines the memory range, the cacheable status and the write protect values for that particular range. In step 346, a determination is made as to whether slot 0 is the active slot. This is necessary because all non-slot 0 memory is considered to be external memory. If slot 0 is not being analyzed, control proceeds to step 348 where the memory starting address and number of 128 kbyte blocks in the particular memory range is determined. Control proceeds to step 350 where the DDR value is set to indicate that there is no local memory and no RASEN* signals are to be made low. This insures that the memory cycle is handled by the bus controller 100 and goes to the ISA bus 36. Control proceeds to step 352 where the DDF_1BLOCK sequence 450 (FIG. 11) is called to program a single 128 kbyte block into the DDF RAM 124. Control proceeds to step 354 where a 128 k value is added to the starting address and the number of blocks is decremented. In step 356 a determination is made as to whether all blocks have been programmed. If not, control returns to step 352 for programming the next block. If so, control proceeds to step 334 to find the next memory range for that particular slot.

Figure 9C:
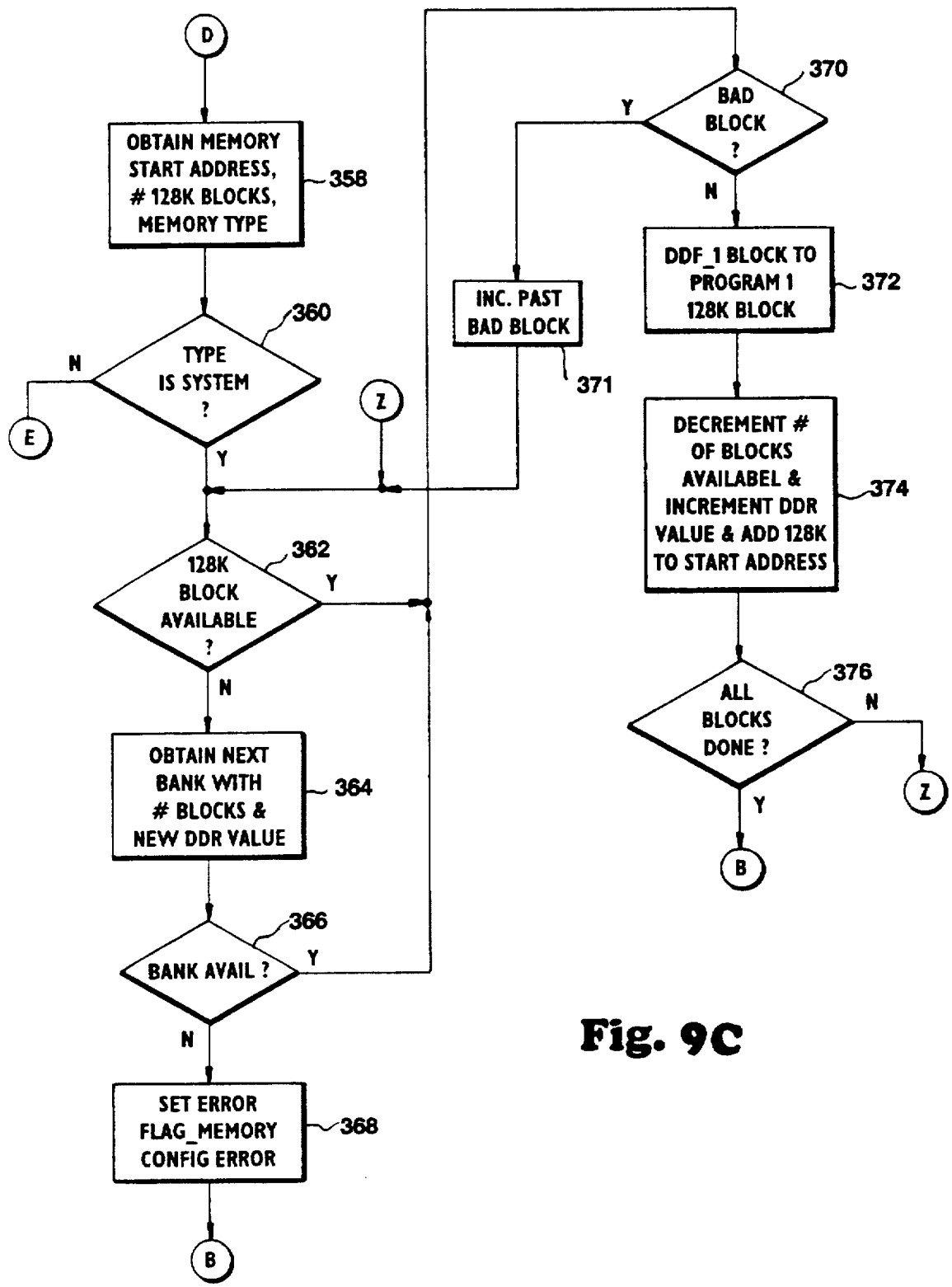

If, in step 346, it was determined that slot 0 was being programmed then control proceeds to step 358 (FIG. 9C) where the memory starting address and the number of 128 kbyte blocks and the memory type is obtained. In step 360 a determination is made if the memory type is system memory. If not, control proceeds to step 350 because non-system memory located on the system board or main memory board is not considered to be local memory. If the memory type is system memory, control proceeds to step 362 where it is determined if a 128 kbyte block is available for programming. If not, control proceeds to step 364 where the next bank of memory is obtained, with the number of blocks available, and a new base DDR value is written to address the new bank. Control then proceeds to state 366 to see if a bank is available. If a bank was not available, control proceeds to step 368 where an error flag is set which indicates that there has been a memory configuration error. Control then proceeds to step 334.

Figure 10:
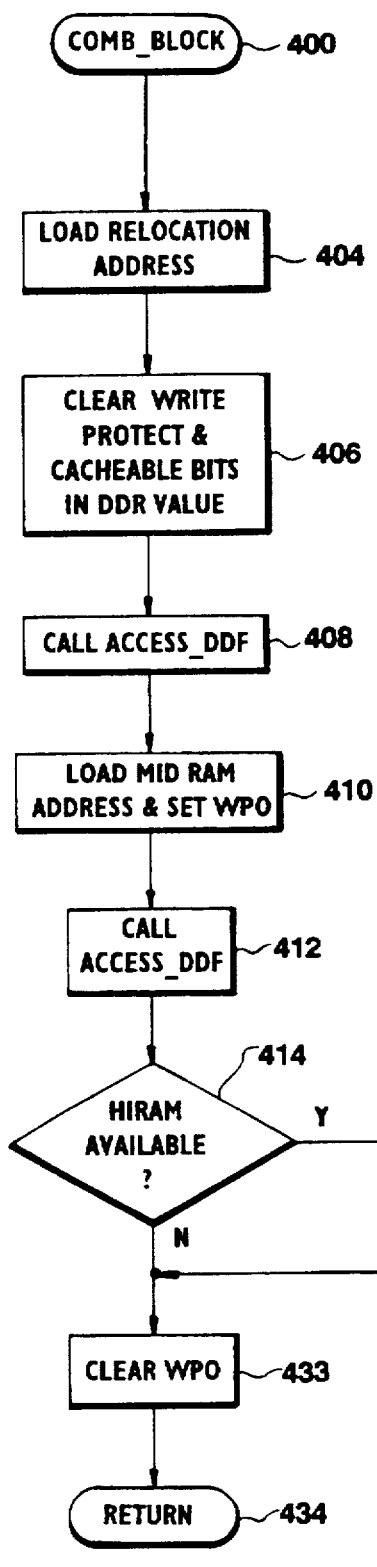

If there were blocks available at step 362 or a bank was available at step 366, control proceeds to step 370 where a determination is made by checking the configuration information as to if this is a bad block of memory by calling the MAP_OUT_BLK sequence 550 (FIG. 10). If so, control proceeds to step 371 where the DDR value is incremented past the bad block. Control then returns to step 362 to see if another block is available. If it is not a bad block, control proceeds to step 372 where the DDF_1BLOCK sequence 450 is called to program one 128 kbyte block with the DDR value that has been set at the starting memory address which has been programmed. In step 374 the number of blocks available is decremented, the DDR value is incremented and 128 k is added to the starting address. Control then proceeds to step 376 where a determination is made as to whether all of the blocks have been programmed. If not, control returns to step 362. If so, control proceeds to step 334 to see if any more memory ranges are to be filled.

The COMB_BLOCK sequence 400 (FIG. 10) is used to properly set the DDF values when the BIOS remapping and RAM write protection is taking place. As discussed in the background of the specification, it is desirable to remap the ROM-based BIOS into high speed 32 bit RAM when the processor is an 80386 or greater. This is because the BIOS ROM is located on the relatively slow X bus 60 and is only 8 bits wide. Thus if access has to be made to the ROM this would slow down the processor operation. By copying the information from the ROM into RAM and then changing the address map of the RAM so that any ROM accesses go to the newly remapped RAM area, system operation speed is increased. The COMB_BLOCK sequence 400 commences at step 404, where the relocation address is loaded. In step 406, the write protect and cacheable bits are cleared in the DDR value so that the relocated BIOS values cannot be written to but are cacheable. In step 408, the ACCESS_DDF sequence 500 is called to set the appropriate DDR value into the DDF location. In the next step, step 410, the mid RAM address is loaded for a mapping of the BIOS ROM and the write protect override bit is set. In step 412, the ACCESS_DDF sequence 500 is again called to program that particular location. In step 414, a determination is made whether the high RAM address is available. If so, in step 430 the high RAM address is loaded and the write protect override bit is set, so that when the ACCESS_DDF sequence 500 is called at step 432 the final DDF location is programmed. If the high RAM address was not available or after step 432, control proceeds to step 433, where the write protect override bit is cleared. In step 434 control returns to the calling sequence.

The DDF_1BLOCK sequence 450 (FIG. 11) is used to program one 128 kbyte block located at the starting memory address with the saved DDR value. The DDF_1BLOCK sequence 450 starts at step 452 where the starting and ending memory addresses are made the same. In step 454 the DDF_BLOCK sequence 460 is called to program the DDF RAM 124. In step 456, control returns to the calling sequence.

The DDF_BLOCK sequence 460 (FIG. 13) commences at step 464 where the ACCESS_DDF sequence 500 is called to program this particular DDF RAM 124 location, as specified by the starting address, with the DDR value. Control proceeds to step 470, where a determination is made as to whether the start and end memory addresses are the same. If so, control proceeds to step 472 which is a return to the calling sequence. If not, control proceeds to step 474, where the starting address is incremented by a 128 k. Control then proceeds to step 462 and the next 128 kbyte block in the DDF RAM 124 is programmed.

The ACCESS_DDF sequence 500 (FIG. 14) commences at step 504, where the DDF programming bit is set and in step 506 the DDR value is written to the DDF data register 122. In step 508, a memory write operation is done to the starting memory address, thus performing the desired programming operation. If the A2 value is a 0, it is a write operation, whereas if the A2 value is a 1, it is a read operation. In step 510, the READ_DDR sequence 600 (FIG. 12) is called to read the DDF RAM 124 to verify that the write sequence performed properly. In step 512, the DDF programming bit is cleared. In step 514, the DDR data register 122 is read to verify the writing of the DDR value. If the value is not verified, control proceeds to step 516, where an error message is displayed. If verified or after step 516, control proceeds to step 518 which is a return to the calling sequence. Thus the ACCESS_DDF sequence 500 performs the necessary setting of the DDF programming bits and values to allow the values to be written to or read from the DDF RAM 124.

Figure 15:
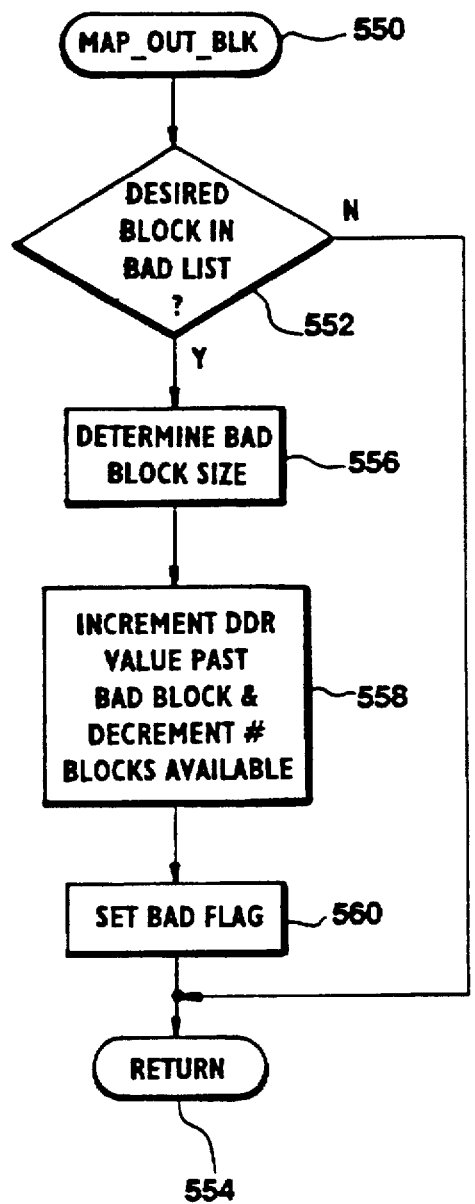

The MAP_OUT_BLK sequence 550 (FIG. 15) is used to check for bad memory blocks and commences at step 552 where a determination is made as to whether the desired block is located in the bad block list of the configuration information. If not, control proceeds to step 554, which is a return to the calling sequence. If the block is in the bad block list, then control proceeds to step 556, where a determination is made as to the bad block size. In step 558, the DDR value is incremented so that it is now past the bad block location and the number of blocks available is decremented by the number of bad blocks. Control proceeds to step 560 where a bad block flag is set prior to the return operation in step 554.

The BLAST_MEM sequence 650 (FIG. 16) commences at step 652 where the DDR value is set for block 0, RASEN 0, no write protect, and local memory so that the first 128 kbyte block in the base memory 40 is to be set as usable. Control proceeds to step 654 where the DDF programming bit is set. In step 656 the DDR value is loaded into the DDF data register 122. In step 658 a write operation to memory address 0 is performed to load the first location in the DDF RAM 124. Control proceeds to step 660 where the DDF programming bit is cleared and the step 662, where control returns to the calling sequence. Thus the first 128 kbyte block is programmed blind.

Figure 12:
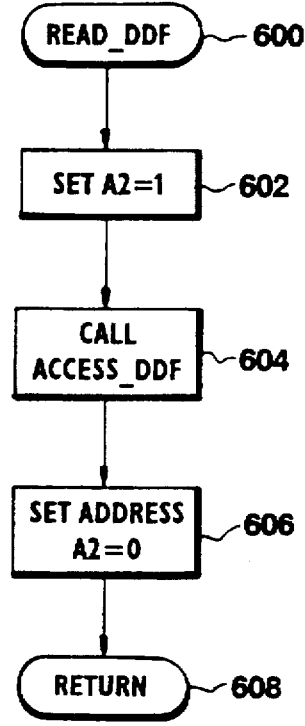

It is also desirable to be able to read the DDF RAM 126 and this can be performed by the READ_DDF sequence 600 (FIG. 12). This sequence is entered with the particular memory address already set in a register so that in step 602 the A2 bit of the starting address is set to 1 to guarantee that a read operation will occur. In step 604 the ACCESS_DDF sequence 500 is called to perform the actual read operation. It is noted that the ACCESS_DDF sequence 500 returns the DDR value. In step 606 the A2 address bit is set to 0 and in step 608 control returns to the calling sequence.

Thus it can be seen that only one pass is made through the DDF RAM 124 when it is programmed, not four passes as in the prior designs. The DDF map conversion circuitry 134 handles the variations in the RELO* and WP* bits which previously made the four passes necessary.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A memory accessing system for use in a computer system having an address bus for communication of address values, a data bus for communication of data values, a control bus for communication of status and timing signals, and predefined register locations for storing values indicating write protect and relocation states of specific portions of memory, the memory accessing system comprising:

at least one memory module containing memory having data inputs and outputs coupled to the data bus and having address line and control inputs;

memory control logic for interfacing said address bus and said control bus to each said memory module, said memory control logic having enable signal inputs for selecting a desired memory module; a plurality of address line inputs, a first portion of said plurality of address line inputs are coupled to the address bus; control signal inputs connected to the control bus; a write protect input which is used to disable write operations to each said memory module; address line outputs which are connected to each said memory module address line inputs; and control signal outputs connected to said memory module control inputs;

memory selection random access memory having address inputs which are coupled to the address bus, having data inputs coupled to the data bus and having data outputs, the data outputs having a first portion, a second portion and a write protect data output, said first portion of said data outputs coupled to said memory control logic enable signal inputs, said second portion of said data outputs coupled to a second portion of said memory control logic plurality of address line inputs and said write protect data output for indicating whether said memory module is write protected; and conversion logic receiving said write protect data output from said memory selection random access memory to selectively modify said write protect data output based on the predefined register location write protect and relocation states and to provide the selectively modified write protect data output to said memory control logic write protect input.

2. The memory accessing system of claim 1, further comprising:

a processor coupled to said memory selection random access memory;

wherein said processor programs data values into said memory selection random access memory.

3. The memory accessing system of claim 2, further comprising:

a data storing element for holding data; and a control storing element for holding a programming mode value, wherein said processor sets a programming mode value in said control storing element and writes data values to said data storing element for providing to said memory selection random access memory.

4. The memory accessing system of claim 3, wherein said processor further causes said data values to be strobed into said memory selection random access memory during a memory space write operation.

5. The memory accessing system of claim 4, further including address decode logic adapted to determine an address on the address bus to enable said data values to be strobed into said memory selection random access memory.

6. The memory accessing system of claim 2, wherein said processor reads a data value contained in said memory selection random access memory.

7. The memory accessing system of claim 6, further comprising:

a data storing element for holding data; and a control storing element for holding a programming mode value.

8. The memory accessing system of claim 7, wherein said processor further causes the data values provided by said memory selection random access memory to be strobed into said data storing element during a memory space read operation.

9. The memory accessing system of claim 8, further including address decode logic adapted to determine an address on the address bus to enable said data values to be strobed into said data storing element.

10. The memory accessing system of claim 1, wherein said conversion logic is adapted to selectively override said selective modification of said write protect data output based on the predefined register location write protect and relocation states and to provide a unmodified write protect data output from said memory selection random access memory to said memory control logic write protect input.

11. The memory accessing system of claim 1, wherein said memory control logic further includes a local memory input which is used to disable operation of said memory modules and wherein said memory selection random access memory has a local memory data output for coupling to said memory control logic local memory input, wherein said conversion logic is adapted to selectively modify said memory selection random access memory local memory data output based on the predefined register location write protect and relocation states and to provide said selectively modified local memory data output to said memory control logic local memory input.

12. The memory accessing system of claim 11, where the coupling of the address bus to said memory selection random access memory results in a given granularity for the data outputs of said memory selection random access memory and wherein said conversion logic is further adapted to selectively modify said local memory data output for portions of a memory segment less than the given granularity defined by said address bus connection to said memory selection random access memory.

13. A computer system, comprising:

a host bus including an address bus, data bus and control bus;

a processor coupled to said host bus;

a hard drive coupled to said host bus;

configuration registers having predefined register locations, a memory accessing system coupling to said address bus for communication of address values, said data bus for communication of data values, said control bus for communication of status and timing signals, said memory accessing system having predefined register locations for storing values indicating write protect and relocation states of specific portions of memory, the memory accessing system comprising:

at least one memory module containing memory having data inputs and outputs coupled to the data bus and having address line and control inputs;

memory control logic for interfacing said address bus and said control bus to each said memory module, said memory control logic having enable signal inputs for selecting a desired memory module; a plurality of address line inputs, a first portion of said plurality of address line inputs are coupled to the address bus; control signal inputs connected to the control bus; a write protect input which is used to disable write operations to each said memory module; address line outputs which are connected to each said memory module address line inputs; and control signal outputs connected to said memory module control inputs;

memory selection random access memory having address inputs which are coupled to the address bus, having data inputs coupled to the data bus and having data outputs, the data outputs having a first portion, a second portion and a write protect data output, said first portion of said data outputs coupled to said memory control logic enable signal inputs, said second portion of said data outputs coupled to a second portion of said memory control logic plurality of address line inputs and said write protect data output for indicating whether said memory module is write protected; and conversion logic receiving said write protect data output from said memory selection random access memory to selectively modify said write protect data output based on the predefined register location write protect and relocation states and to provide the selectively modified write protect data output to said memory control logic write protect input.

14. The computer system of claim 13, wherein said processor is coupled to said memory selection random access memory, and wherein said processor programs data values into said memory selection random access memory.

15. The computer system of claim 14, further comprising:

a data storing element for holding data; and a control storing element for holding a programming mode value, wherein said processor sets a programming mode value in said control storing element and writes data values to said data storing element for providing to said memory selection random access memory.

16. The computer system of claim 15, wherein said processor further causes said data values to be strobed into said memory selection random access memory during a memory space write operation.

17. The computer system of claim 16, further including address decode logic adapted to determine an address on the address bus to enable said data values to be strobed into said memory selection random access memory.

18. The computer system of claim 14, where in said processor reads a data value contained in said memory selection random access memory.

19. The computer system of claim 18, further comprising:

a data storing element for holding data; and a control storing element for holding a programming mode value.

20. The computer system of claim 19, wherein said processor further causes the data values provided by said memory selection random access memory to be strobed into said data storing element during a memory space read operation.

21. The computer system of claim 20, further including address decode logic adapted to determine an address on the address bus to enable said data values to be strobed into said data storing element.

22. The computer system of claim 13, wherein said conversion logic is adapted to selectively override said selective modification of said write protect data output based on the predefined register location write protect and relocation states and to provide a unmodified write protect data output from said memory selection random access memory to said memory control logic write protect input.

23. The computer system of claim 13, wherein said memory control logic further includes a local memory input which is used to disable operation of said memory modules and wherein said memory selection random access memory has a local memory data output for coupling to said memory control logic local memory input, wherein said conversion logic is adapted to selectively modify said memory selection random access memory local memory data output based on the predefined register location write protect and relocation states and to provide said selectively modified local memory data output to said memory control logic local memory input.

24. The computer system of claim 23, where the coupling of the address bus to said memory selection random access memory results in a given granularity for the data outputs of said memory selection random access memory and wherein said conversion logic is further adapted to selectively modify said local memory data output for portions of a memory segment less than the given granularity defined by said address bus connection to said memory selection random access memory.

* * * * *

UNITED STATES PATENT AND TRADEMARK OFFICE
CERTIFICATE OF CORRECTION

PATENT NO. : 5,751,998

DATED : 5/12/98

INVENTOR(S) : RUSSELL J. WUNDERLICH ET AL.

It is certified that error appears in the above-identified patent and that said Letters Patent is hereby corrected as shown below:

COLUMN 22, CLAIM 13, LINE 45, PLEASE DELETE "," AND INSERT --;--

COLUMN 23, CLAIM 18, LINE 43, PLEASE DELETE "WHERE IN" AND INSERT --WHEREIN--.

COLUMN 24, CLAIM 22, LINE 19, PLEASE DELETE "A" AND INSERT THEREFOR --AN--.

Signed and Sealed this

Fourth Day of August, 1998

Attest:

Attesting Officer

BRUCE LEHMAN

Commissioner of Patents and Trademarks